(12) United States Patent
Lim et al.

(10) Patent No.: US 11,095,919 B2
(45) Date of Patent: Aug. 17, 2021

(54) ENCODER, DECODER, ENCODING METHOD, AND DECODING METHOD

(71) Applicant: Panasonic Intellectual Property Corporation of America, Torrance, CA (US)

(72) Inventors: Chong Soon Lim, Singapore (SG); Han Boon Teo, Singapore (SG); Takahiro Nishi, Nara (JP); Tadamasa Toma, Osaka (JP); Ru Ling Liao, Singapore (SG); Sughosh Pavan Shashidhar, Singapore (SG); Hai Wei Sun, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 131 days.

(21) Appl. No.: 16/194,586

(22) Filed: Nov. 19, 2018

(65) Prior Publication Data

US 2019/0110076 A1    Apr. 11, 2019

Related U.S. Application Data

(63) Continuation of application No. PCT/JP2017/019113, filed on May 23, 2017.
(Continued)

(51) Int. Cl.
*H04N 19/597* (2014.01)
*H04N 19/159* (2014.01)
(Continued)

(52) U.S. Cl.
CPC .......... *H04N 19/597* (2014.11); *G06T 5/006* (2013.01); *H04N 19/159* (2014.11);
(Continued)

(58) Field of Classification Search
CPC . H04N 19/597; H04N 19/159; H04N 5/23238
(Continued)

(56) References Cited

U.S. PATENT DOCUMENTS

| | | | |
|---|---|---|---|
| 2010/0046635 A1* | 2/2010 | Pandit | .................... H04N 19/46 375/240.25 |
| 2019/0158804 A1* | 5/2019 | Park | .................... H04N 13/133 |

FOREIGN PATENT DOCUMENTS

| | | |
|---|---|---|
| JP | 2008-034892 | 2/2008 |
| JP | 2010-524398 | 7/2010 |

(Continued)

OTHER PUBLICATIONS

International Search Report dated Aug. 15, 2017 in International (PCT) Application No. PCT/JP2017/019113.
(Continued)

*Primary Examiner* — Jeffery A Williams
(74) *Attorney, Agent, or Firm* — Wenderoth, Lind & Ponack, L.L.P.

(57) ABSTRACT

An encoder capable of properly handling an image to be encoded or decoded includes processing circuitry and memory connected to the processing circuitry. Using the memory, the processing circuitry: obtains parameters including at least one of (i) one or more parameters related to a first process for correcting distortion in an image captured with a wide angle lens and (ii) one or more parameters related to a second process for stitching a plurality of images; generates an encoded image by encoding a current image to be processed that is based on the image or the plurality of images; and writes the parameters into a bitstream including the encoded image.

16 Claims, 44 Drawing Sheets

Related U.S. Application Data

(60) Provisional application No. 62/342,517, filed on May 27, 2016.

(51) Int. Cl.
*H04N 5/00* (2011.01)
*H04N 19/46* (2014.01)
*H04N 19/176* (2014.01)
*G06T 5/00* (2006.01)
*H04N 19/85* (2014.01)

(52) U.S. Cl.
CPC ........... *H04N 19/176* (2014.11); *H04N 19/46* (2014.11); *H04N 19/85* (2014.11)

(58) Field of Classification Search
USPC .................................................... 375/240.02
See application file for complete search history.

(56) References Cited

FOREIGN PATENT DOCUMENTS

| | | |
|---|---|---|
| JP | 2010-239221 | 10/2010 |
| WO | 2004/004363 | 1/2004 |
| WO | 2011/129163 | 10/2011 |

OTHER PUBLICATIONS

H.265 (ISO/IEC 23008-2 High Efficiency video coding (HEVC)), Dec. 1, 2013.
Guoxin Jin, et al., "Motion Estimation and Compensation for Fisheye Warped Video", 2015 IEEE International Conference on Image Processing (ICIP), Sep. 27, 2015, pp. 2751-2755.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

FIG. 15
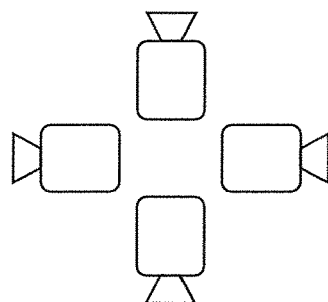
CAMERAS COVERING
MORE THAN ONE VIEW
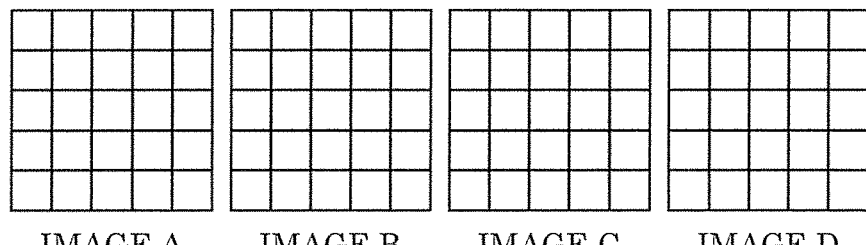
IMAGE A   IMAGE B   IMAGE C   IMAGE D
TOP VIEW
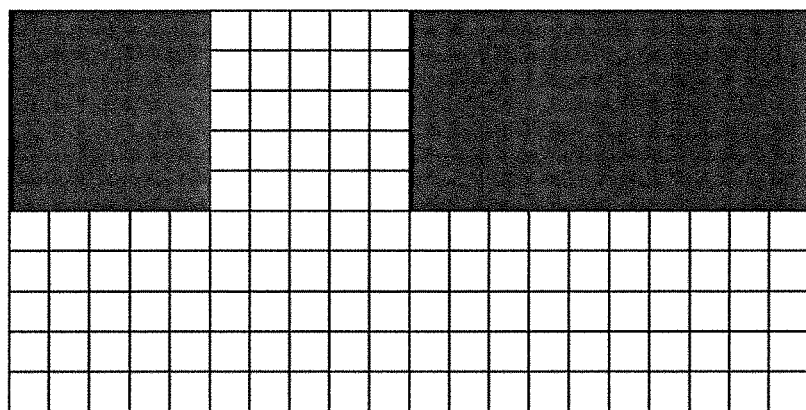
STITCHED IMAGE WITH EMPTY REGION FIG. 17
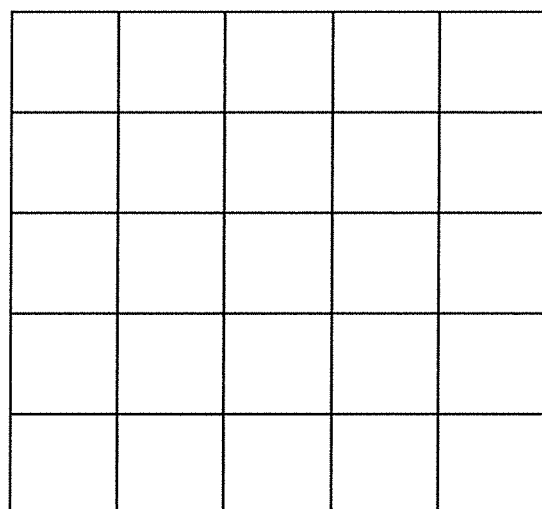
ACTUAL SHAPE
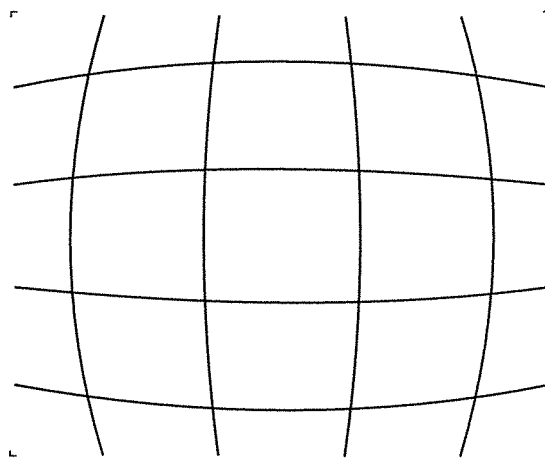
FISHEYE LENS
BARREL DISTORTION

ENCODER, DECODER, ENCODING METHOD, AND DECODING METHOD

CROSS REFERENCE TO RELATED APPLICATIONS

This application is a U.S. continuation application of PCT International Patent Application Number PCT/JP2017/019113 filed on May 23, 2017, claiming the benefit of priority of U.S. Provisional Patent Application No. 62/342,517 filed on May 27, 2016, the entire contents of which are hereby incorporated by reference.

BACKGROUND

1. Technical Field

The present disclosure relates to a device and method for encoding an image and a device and method for decoding an encoded image.

2. Description of the Related Art

Currently, the HEVC standard for image encoding is in policy (e.g., see H.265 (ISO/IEC 23008-2 HEVC (High Efficiency Video Coding))). However, the transmission and storage of next-generation video (e.g., 360-degree video) demand coding efficiency that exceed current coding capabilities. Some research and experiments relating to compressing images and videos captured using a wide angle lens such as a non rectilinear lens have been conducted in the past. The techniques that are typically used in the research and experiments are image processing techniques to manipulate image samples to remove barrel distortion, to produce rectilinear images prior to the encoding of the current image. Accordingly, generally, image processing techniques are used.

SUMMARY

However, with conventional encoders and decoders, there is a problem that an image to be encoded or decoded cannot be properly handled.

In view of the above, the present disclosure provides, for example, an encoder capable of properly handling an image to be encoded or decoded.

An encoder according to one aspect of the present disclosure includes processing circuitry and memory connected to the processing circuitry. Using the memory, the processing circuitry: obtains parameters including at least one of (i) one or more parameters related to a first process for correcting distortion in an image captured with a wide angle lens and (ii) one or more parameters related to a second process for stitching a plurality of images; generates an encoded image by encoding a current image to be processed that is based on the image or the plurality of images; and writes the parameters into a bitstream including the encoded image.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

The encoder according to the present disclosure is capable of properly handling an image to be encoded or decoded.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 15 illustrates the arrangement of cameras and a stitched image, including an empty region, generated by stitching images captured by the cameras together, according to Embodiment 2;

FIG. 17 illustrates one example of barrel distortion generated by a non rectilinear lens or fisheye lens, according to Embodiment 2;

DETAILED DESCRIPTION OF THE EMBODIMENTS

Hereinafter, embodiments will be described in detail with reference to the drawings.

Each embodiment described below shows a general or specific example. The numerical values, shapes, materials, components, the arrangement and connection of the components, steps, the processing order of the steps etc. shown in the following embodiments are mere examples, and therefore do not limit the scope of the Claims. Therefore, among the components in the following embodiments, those not recited in any one of the independent claims defining the broadest concept of the present disclosure are described as optional components.

Embodiment 1

[Encoding Device Outline]

Figure 1:
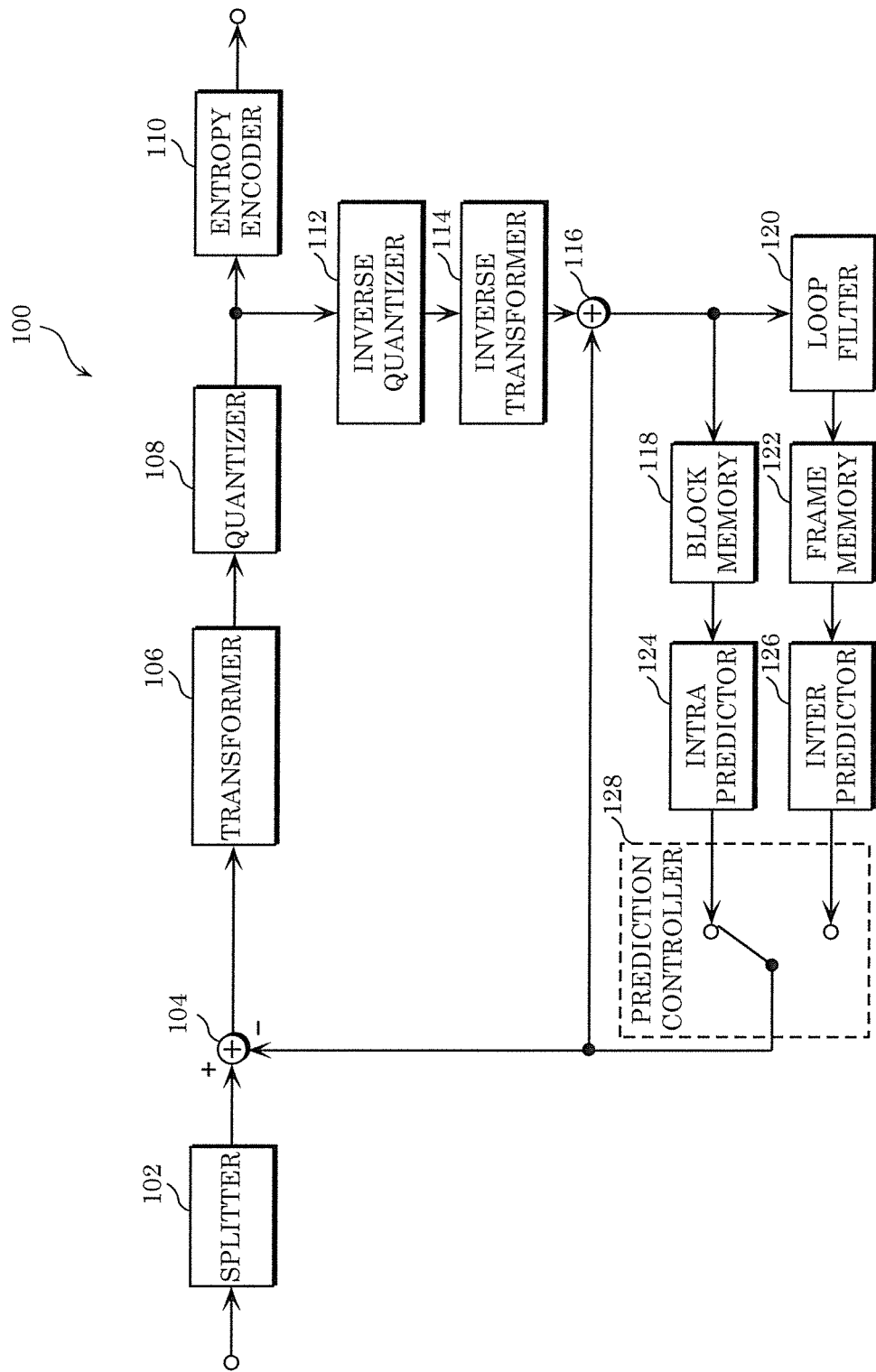
FIG. 1 is a block diagram illustrating a functional configuration of the encoding device according to Embodiment 1.

First, the encoding device according to Embodiment 1 will be outlined. FIG. 1 is a block diagram illustrating a functional configuration of encoding device 100 according to Embodiment 1. Encoding device 100 is a moving picture/picture encoding device that encodes a moving picture/picture block by block.

As illustrated in FIG. 1, encoding device 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoding device 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoding device 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoding device 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
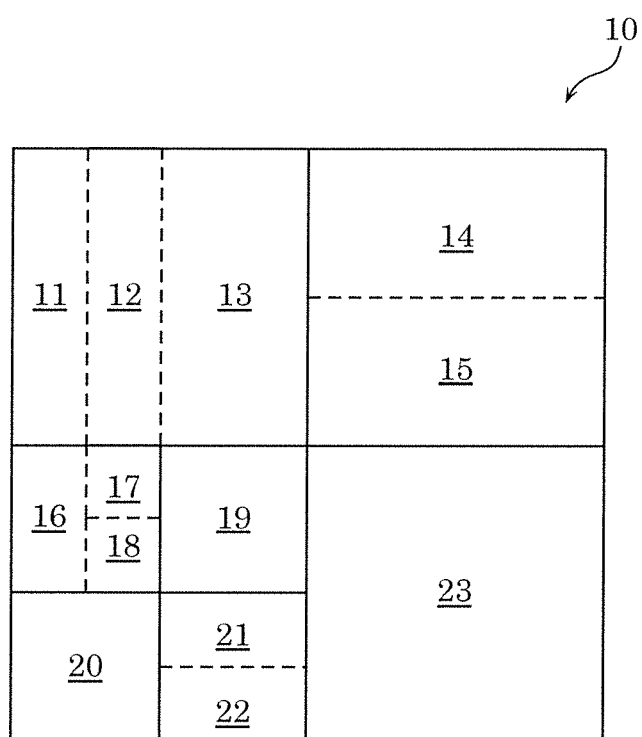
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting).

As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoding device 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction signals, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter] Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
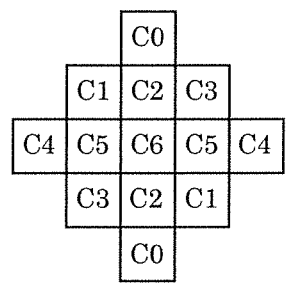
FIG. 4A illustrates one example of a filter shape used in ALF.
Figure 4B:
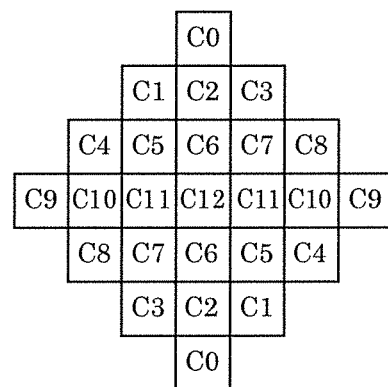
FIG. 4B illustrates another example of a filter shape used in ALF.
Figure 4C:
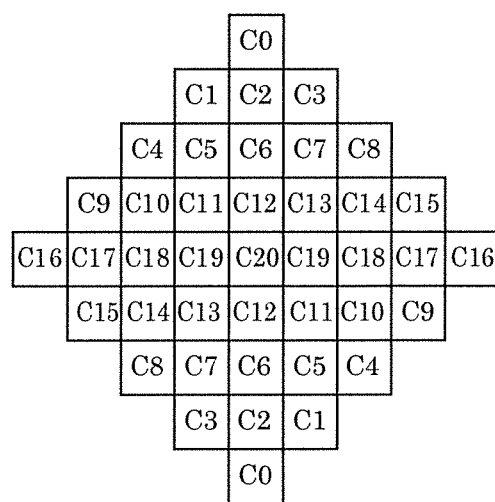
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5:
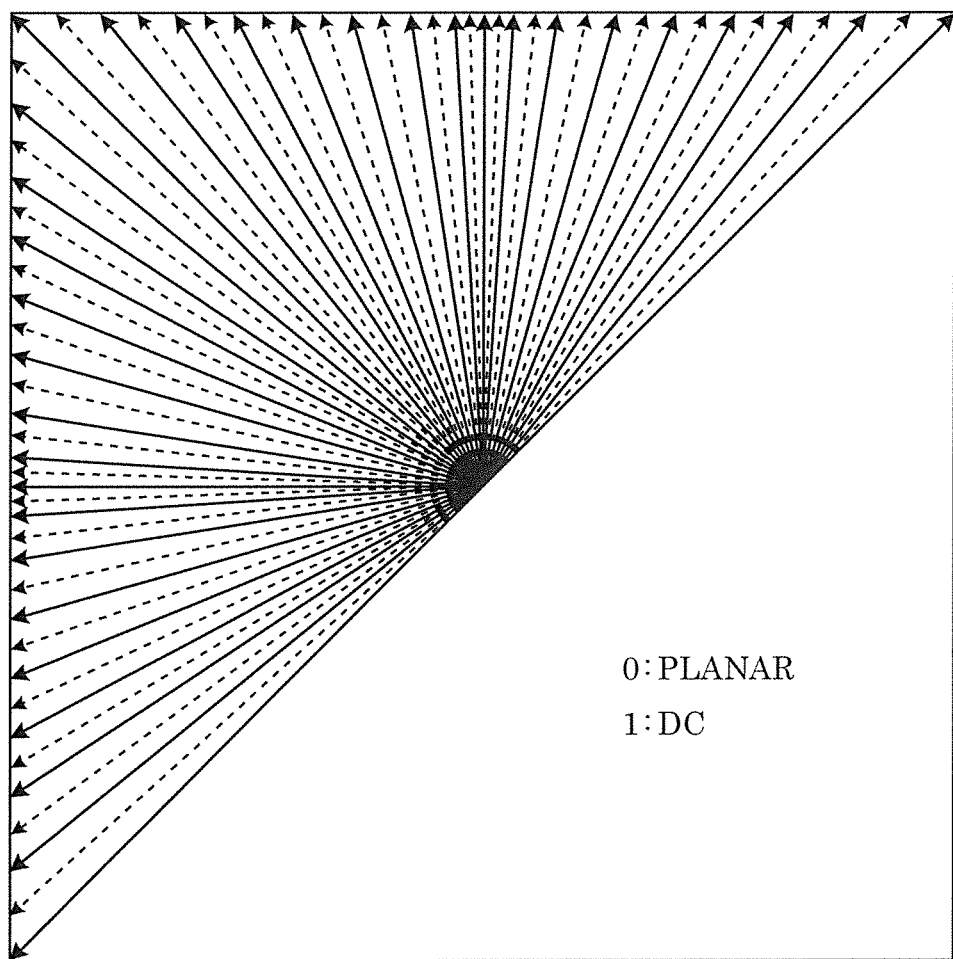
FIG. 5 illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5 illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Note that the motion information may be derived on the decoding device side without being signalled. For example, a merge mode defined in the H.265/HEVC standard may be used. Moreover, for example, the motion information may be derived by performing motion estimation on the decoding device side. In this case, motion estimation is performed without using the pixel values of the current block.

Here, a mode for performing motion estimation on the decoding device side will be described. A mode for performing motion estimation on the decoding device side is also referred to as pattern matched motion vector derivation (PMMVD) mode or frame rate up-conversion (FRUC) mode.

First, one candidate included in a merge list is selected as the starting point for the search by pattern matching. The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures.

Figure 6:
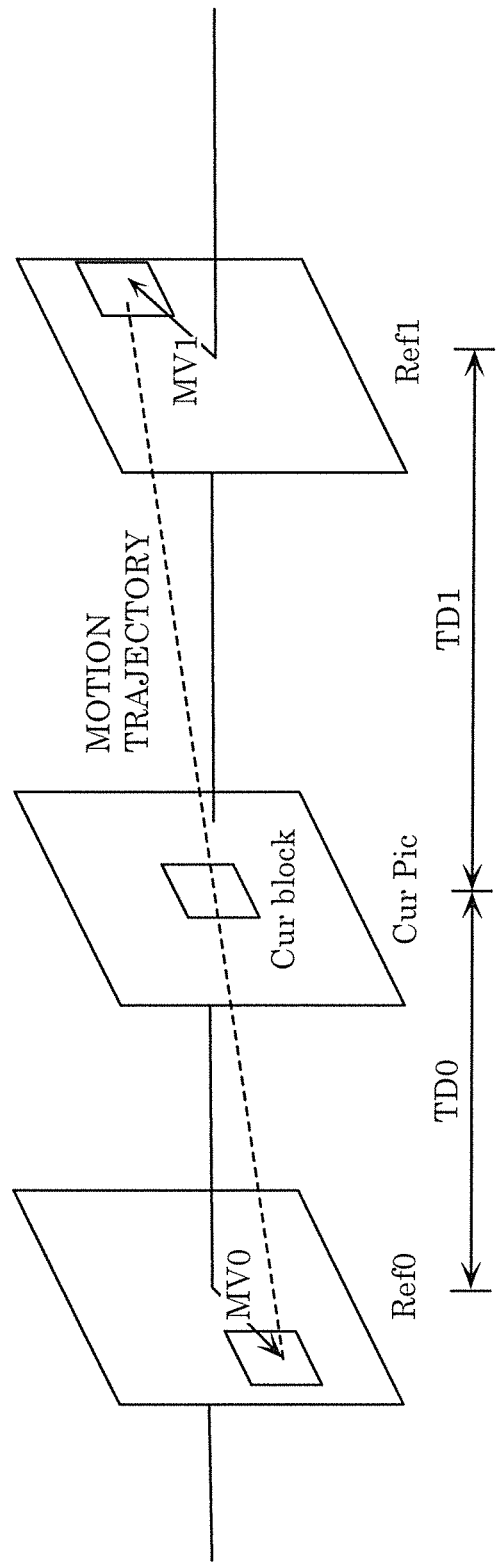
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1).

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture.

Figure 7:
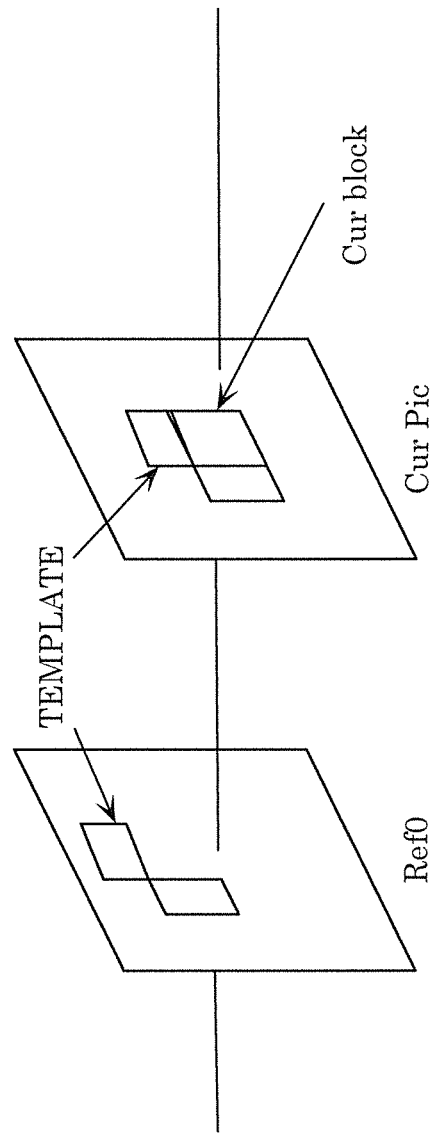
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic).

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

It is to be noted that motion information may be derived on the decoding device side using a method different from motion estimation. For example, the amount of correction for a motion vector may be calculated using the pixel value of a neighboring pixel in unit of a pixel, based on a model assuming uniform linear motion.

Here, a mode for deriving a motion vector based on a model assuming uniform linear motion will be described. This mode is also referred to as a bi-directional optical flow (BIO) mode.

Figure 8:
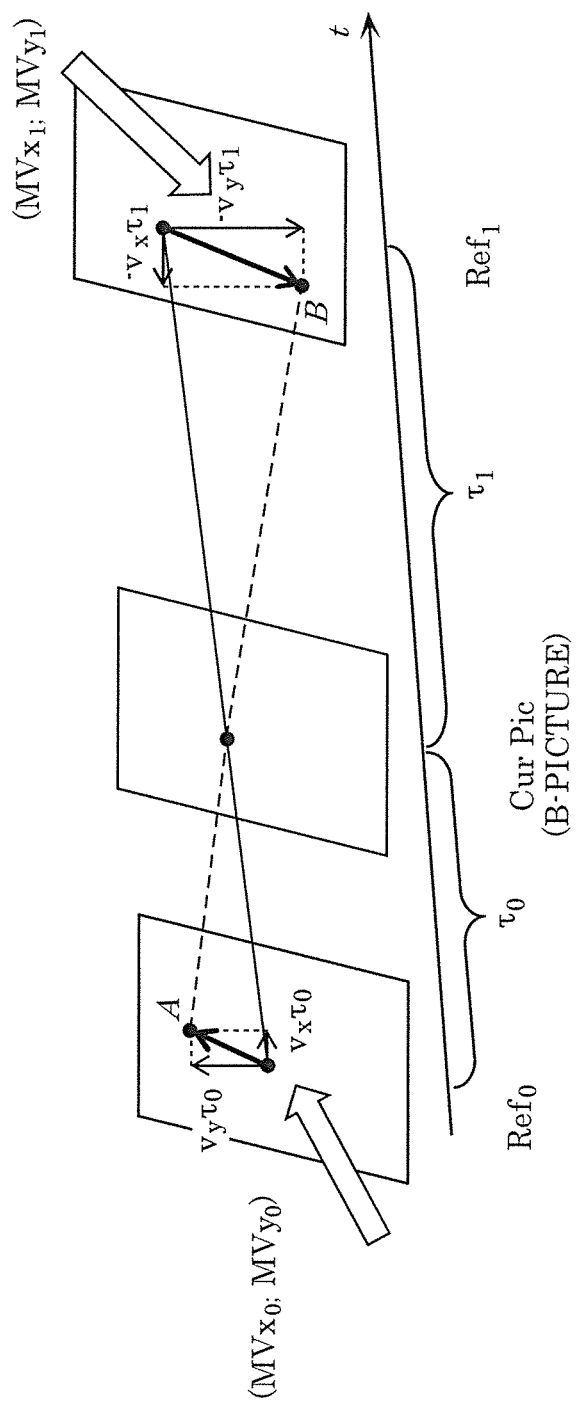
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

[MATH. 1]

$$\partial I^{(k)}/\partial t + v_x \partial I^{(k)}/\partial x + v_y \partial I^{(k)}/\partial y = 0. \qquad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoding device side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9:
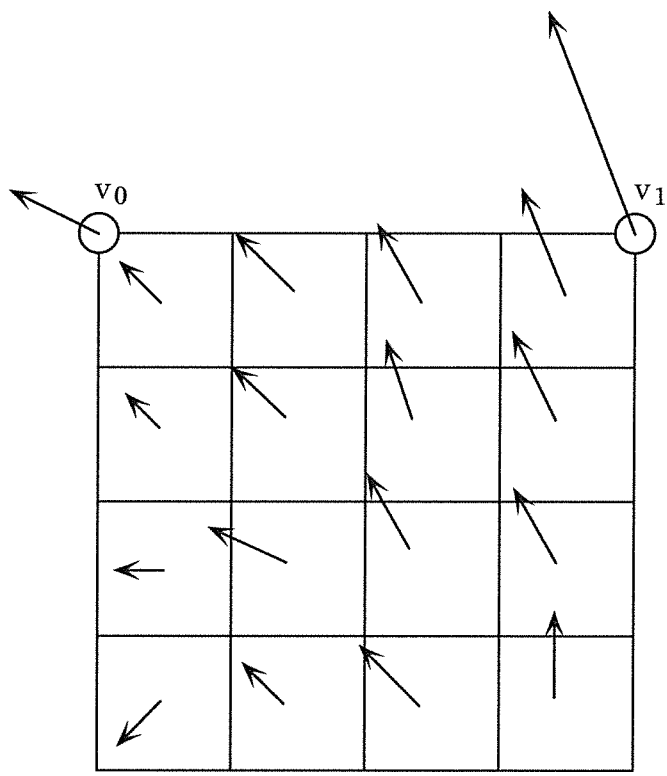
FIG. 9 is for illustrating deriving a motion vector of each sub-block based on motion vectors of neighboring blocks.

FIG. 9 is for illustrating deriving a motion vector of each sub-block based on motion vectors of neighboring blocks. In FIG. 9, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

[MATH. 2]

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

[Decoding Device Outline]

Figure 10:
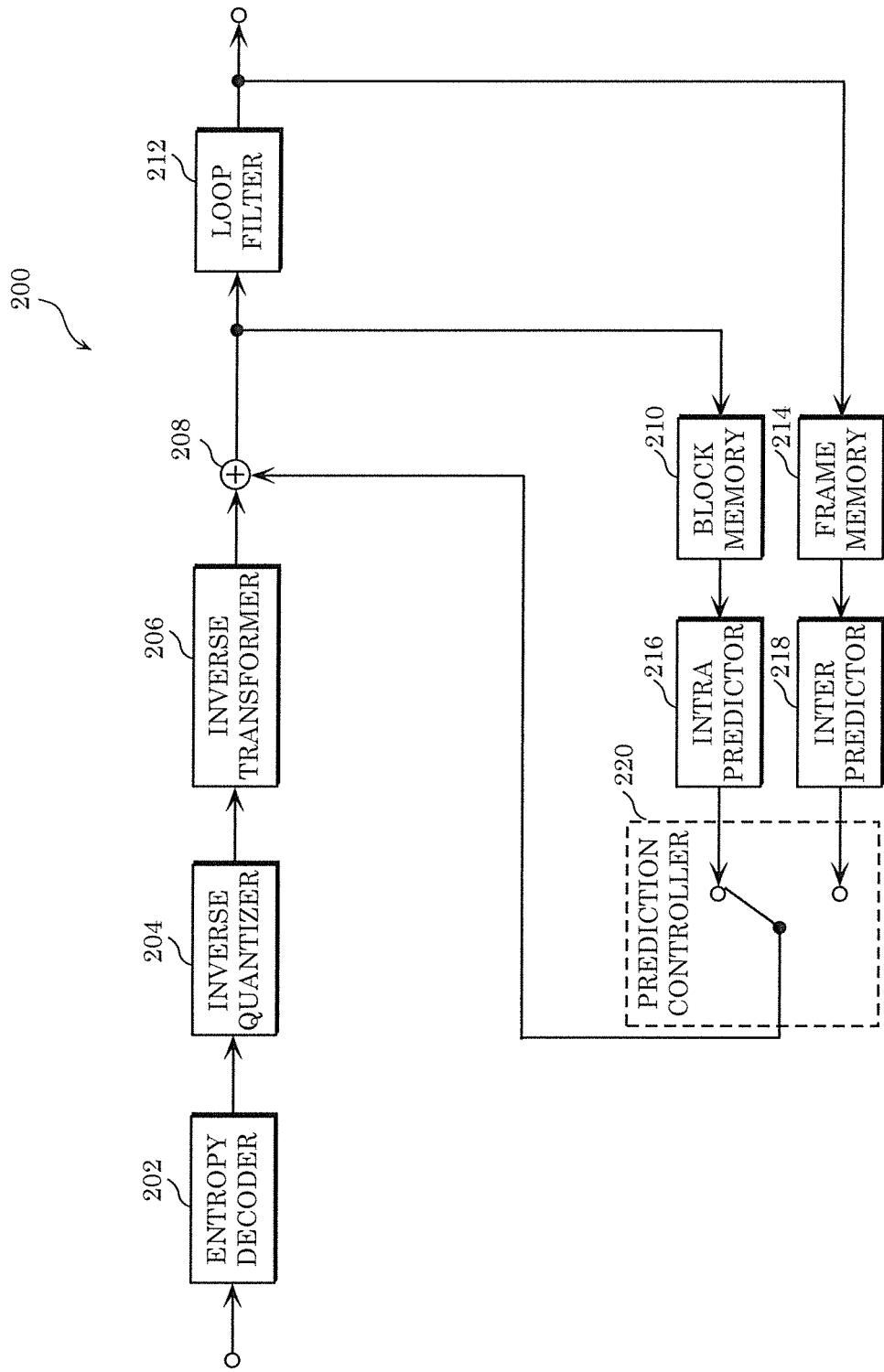
FIG. 10 is a block diagram illustrating a functional configuration of the decoding device according to Embodiment 1.

Next, a decoding device capable of decoding an encoded signal (encoded bitstream) output from encoding device 100 will be described. FIG. 10 is a block diagram illustrating a functional configuration of decoding device 200 according to Embodiment 1. Decoding device 200 is a moving picture/picture decoding device that decodes a moving picture/picture block by block.

As illustrated in FIG. 10, decoding device 200 includes entropy decoder 202, inverse quantizer 204, inverse transformer 206, adder 208, block memory 210, loop filter 212, frame memory 214, intra predictor 216, inter predictor 218, and prediction controller 220.

Decoding device 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoding device 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoding device 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients (transform results).

[Adder]

Adder 208 reconstructs the current block by summing prediction errors, which are inputs from inverse transformer 206, and prediction signals, which are inputs from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 126 generates an inter prediction signal of the current block or sub-block by motion compensation by using motion information (for example, a motion vector) parsed from an encoded bitstream, and outputs the inter prediction signal to prediction controller 128.

Note that when the information parsed from the encoded bitstream indicates application of OBMC mode, inter predictor 126 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

Embodiment 2

Hereinafter, some processes performed by encoder 100 and decoder 200 configured as described above will be described in detail with reference to the drawings. Note that those skilled in the art shall understand that the following embodiments may be combined to further enhance the benefits of the present disclosure.

The encoder, the decoder, and the like according to this embodiment can be used in the encoding and decoding of any given multimedia data. More specifically, the encoder, the decoder, and the like according to this embodiment can be used in the encoding and decoding of an image captured with a non rectilinear (e.g., a fisheye) lens camera.

Here, with the background art described above, the same video encoding tools are used to compress processed images and images directly captured by a rectilinear lens. There is no video encoding tool in the background art that is specially customized to compress these type of processed images differently.

Typically, a 360-degree image is originally captured by multiple cameras and the images captured from the multiple cameras are stitched together to form a large image. In some cases, there is an image conversion process involved to "defish" or to rectify the image to become rectilinear prior to the encoding of the image so that the images can be more pleasantly presented on a flat display or the objects in the image can be detected easier using machine learning techniques. However, the image conversion process usually interpolates the image samples and thus creates redundancy in the information carried in the image. The stitching and conversion processes in some cases also create an empty region in the image that is generally filled with default pixel values (e.g. black colored pixels). These issues caused by the stitching and conversion processes reduce the coding efficiency of the encoding processes.

To solve these problems, in this embodiment, adaptive video encoding tools and adaptive video decoding tools are used as customized video encoding tools and video decoding tools. To improve the coding efficiency, these adaptive video encoding tools can be adaptive based on the image conversion or image stitching processes used to process the images prior to the encoder. The present disclosure can adapt the video encoding tools during the encoding process to suit such processes to reduce any redundancies as a result of these processes. The same applies to the adaptive video decoding tools as well.

In this embodiment, information on the image conversion and/or image stitching processes is used to adapt the video encoding tools and the video decoding tools. Accordingly, video encoding tools and video decoding tools can be adapted for different types of processed images. Thus, according to this embodiment, compression efficiency can be improved.

[Encoding Process]

Figure 11:
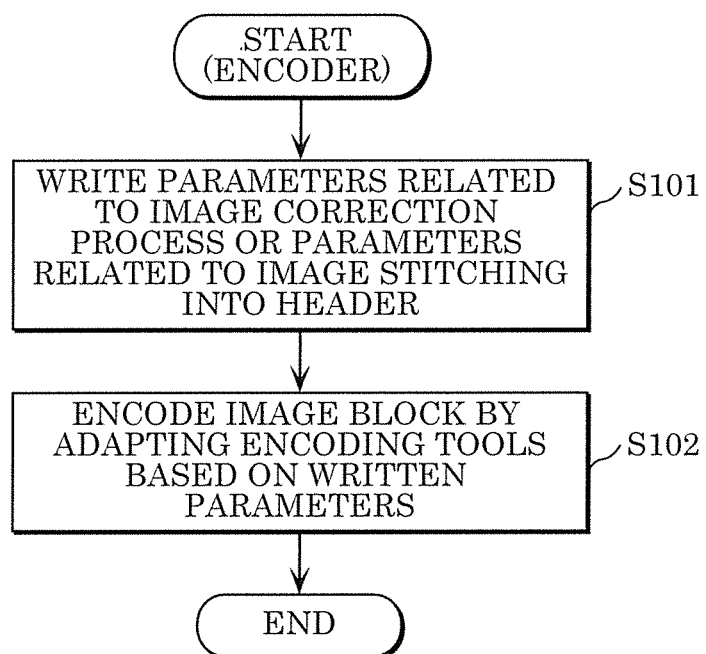
FIG. 11 is a flow chart illustrating one example of a video encoding process according to Embodiment 2.

A method of video encoding an image captured using a non rectilinear lens according to Embodiment 2 of the present disclosure as illustrated in FIG. 11 will be described. Note that a non rectilinear lens is a wide angle lens or one example thereof.

FIG. 11 is a flow chart illustrating one example of a video encoding process according to this embodiment.

Figure 12:
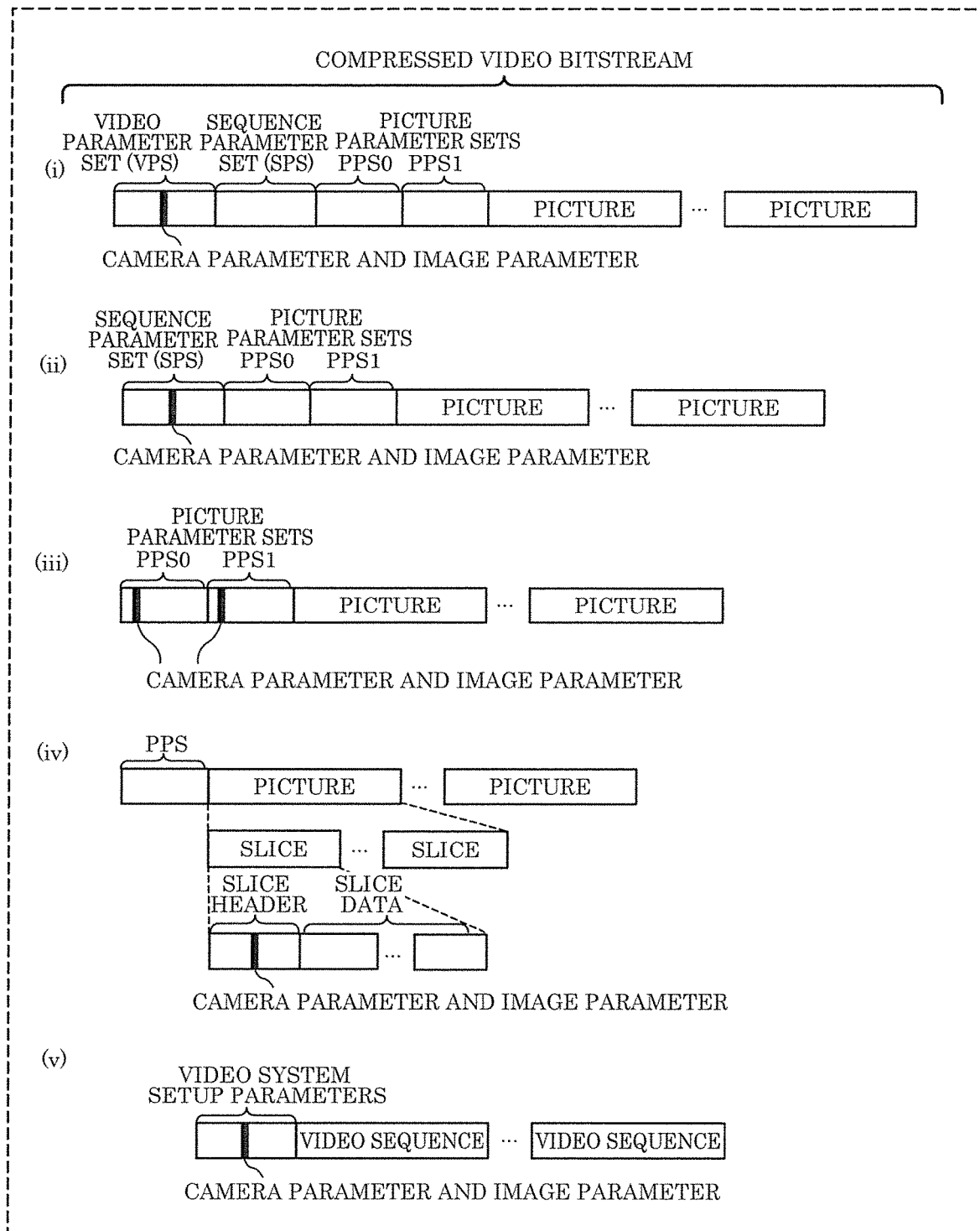
FIG. 12 illustrates possible locations that headers can be written into a bitstream according to Embodiment 2.

In step S101, the encoder writes a set of parameters into a header. FIG. 12 illustrates the possible locations of the above mentioned header in a compressed video bitstream. The written parameters (i.e., the camera parameter and image parameter in FIG. 12) include one or more parameters related to an image correction process. For example, as illustrated in FIG. 12, these parameters are written in a video parameter set, sequence parameter set, picture parameter set, slice header, or video system setup parameter set. Stated differently, in this embodiment, written parameters may be written in some header or supplemental enhancement information (SEI) in a bitstream. Note that the image correction process corresponds to the above mentioned image conversion process.

<Examples of Image Correction Process Parameters>

Figure 13:
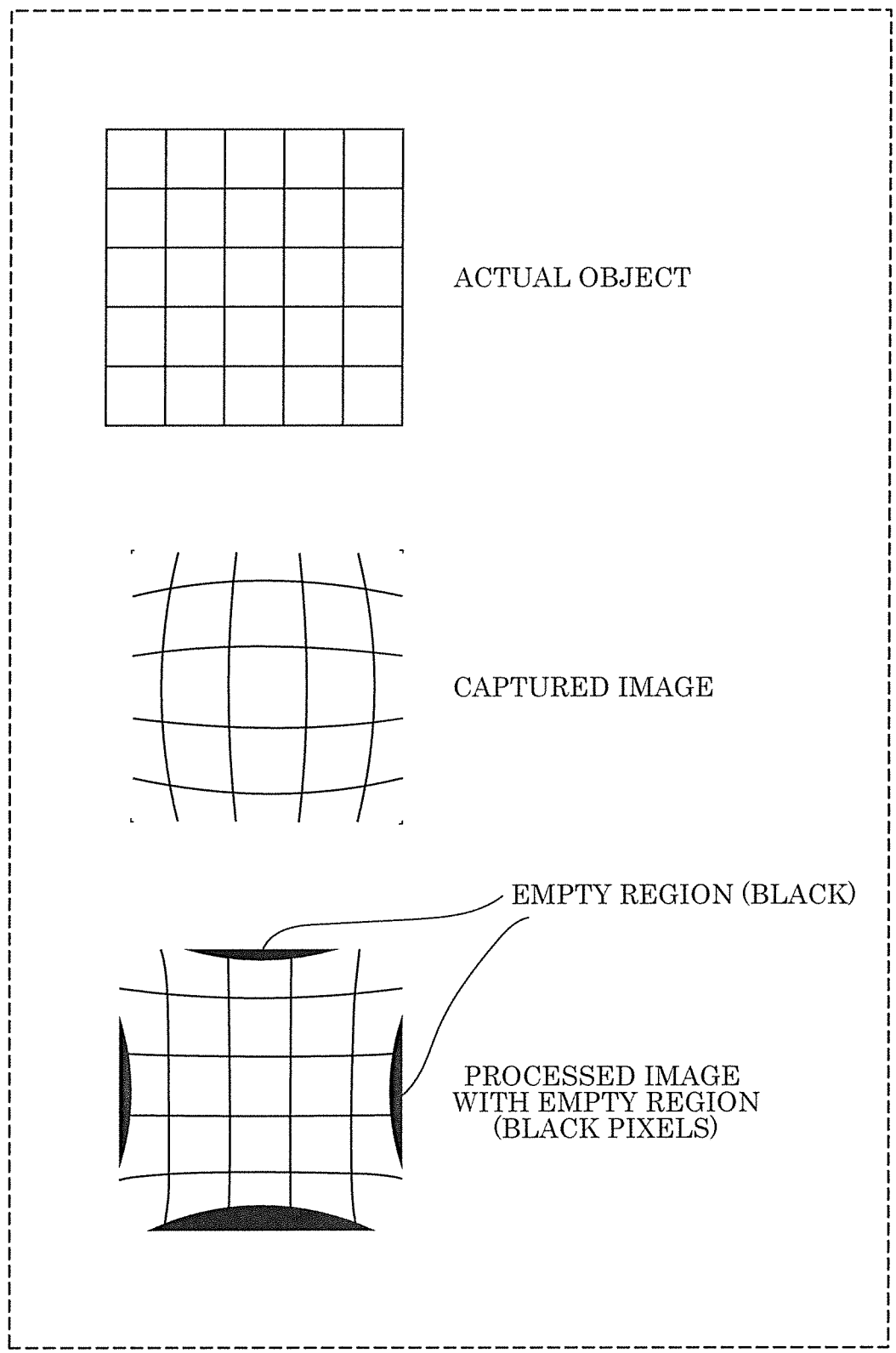
FIG. 13 illustrates a captured image and an image correction processed image according to embodiment 2.

As illustrated in FIG. 13, the captured image may be distorted due to the characteristics of the lens used during the capturing of the image. An image correction process was used to rectify the captured image to rectilinear. Note that a rectangular image is generated by rectifying the captured image to rectilinear. Written parameters include parameters for specifying or describing the image correction process to be used. An example of parameters used in the image correction process include parameters configuring a mapping table to map input image pixels to the intended output pixel values of the image correction process. These parameters may include weight parameters for one or more interpolation process or/and position parameters identifying the locations of the input and output pixels in a picture. In one possible implementation example of the image correction process, the mapping table for the image correction process may be used for all the pixels in the corrected image.

Other examples of parameters used to describe the image correction process include a selection parameter to select one out of a plurality of pre-defined correction algorithms, a direction parameter to select one out of a plurality of pre-determined direction of the correction algorithms or/and calibration parameters to calibrate or fine tune the correction algorithms. For example, when there is a plurality of pre-defined correction algorithms (e.g., different algorithms are used for different types of lenses), the selection parameter is used to select one of these pre-defined algorithms. For example, when there is more than one direction that the correction algorithms can be applied in (e.g., image correction process can be perform horizontally, vertically or both directions), the direction parameter selects one of these pre-defined directions. When the image correction process can be calibrated, the calibration parameters allow the adjustment of the image correction process to suit different types of lenses.

<Examples of Stitching Process Parameters>

Figure 14:
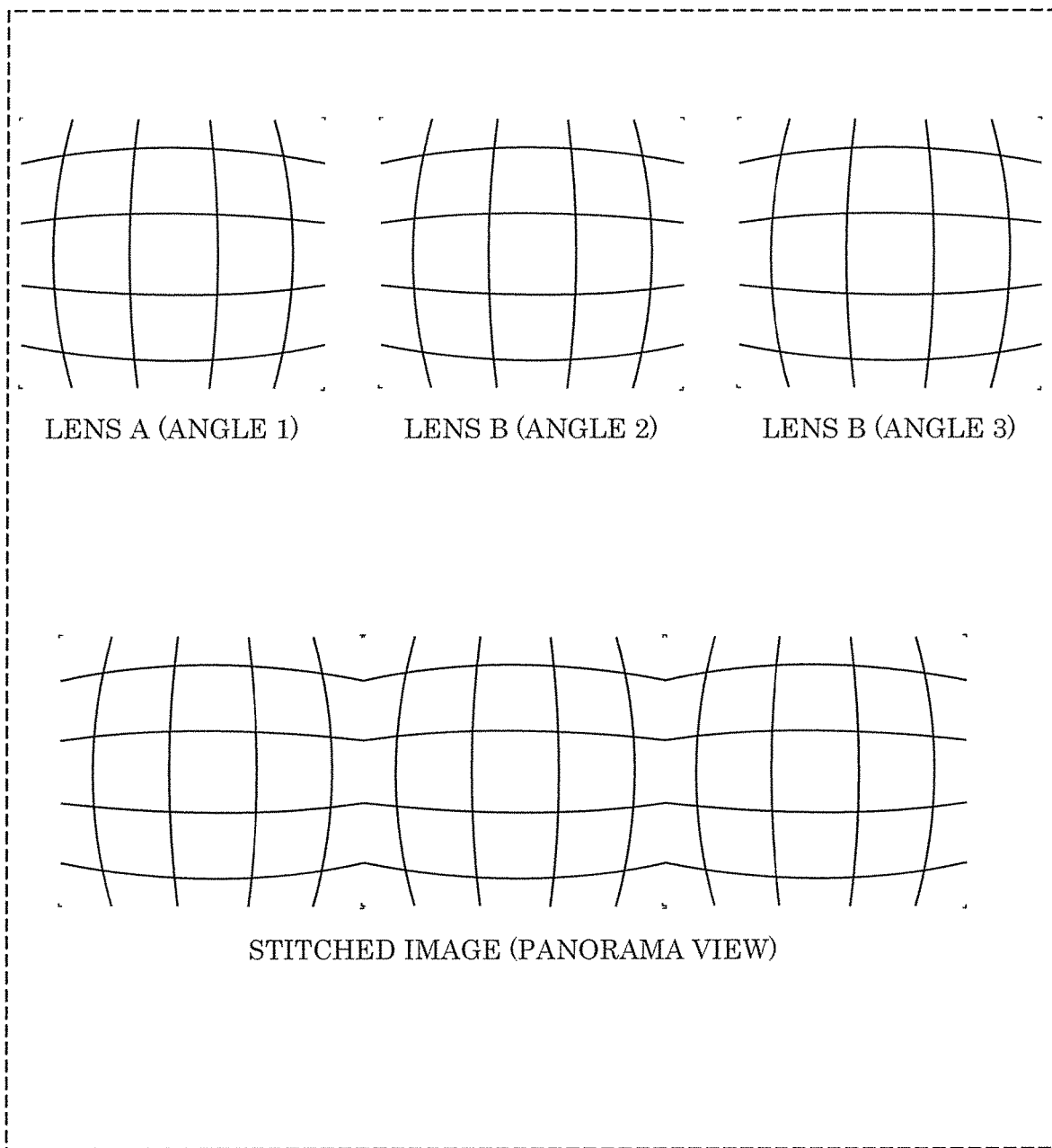
FIG. 14 illustrates a stitched image generated by stitching together images via a stitching process according to Embodiment 2.

The written parameters may also include one or more parameters related to a stitching process. As illustrated in FIG. 14 and FIG. 15, an image to be input into the encoder may be the result of a stitching process that combines a plurality of images from different cameras. The written parameters include, for example, parameters that provide information related to the stitching process, such as the number of cameras, the distortion centers or principle center of each camera, the level of distortion, etc. Another example of the parameters describing the stitching process include parameters that identify the locations of the stitched images that are generated from overlapping pixels from a plurality of images. Each of these images may contain pixels that may appear in other images as the angles of the cameras may have overlapping regions. During the stitching process, these overlapping pixels are processed and reduced to produce the stitched image.

Another example of the parameters describing the stitching process include parameters that identify the layout of the stitched image. For example, depending on the 360 image format such as equirectangular projection, Cubic-3×2 layout, Cubic-4×3 layout, the arrangement of the images within the stitched image is different. Note that the 3×2 layout is a layout of 6 images arranged in 3 columns and 2 rows, and the 4×3 layout is a layout of 12 images arranged in 4 columns and 3 rows. The layout parameter, which is one of the above mentioned parameters, will be used to identify the continuity of the images in certain directions based on the arrangement of the images. During the motion compensation process, pixels from other images or views can be used for inter prediction process and these images or views are identified by the layout parameter. Some images or pixels in the images may also be required to be rotated to ensure the continuity.

Other examples of the parameters include camera and lens parameters (e.g., focal length, principle point, scale factor, image sensor format used in the camera, etc). More examples of the parameters include the physical information related to the placement of the camera (e.g. the position of the camera, the angle of the camera, etc).

Next, in step S102, the encoder encodes an image by adaptive video encoding tools based on these written parameters. The adaptive video encoding tools include an inter prediction process. The set of adaptive video encoding tools may also include a picture reconstruction process.

<Distortion Correction in Inter Prediction>

Figure 16:
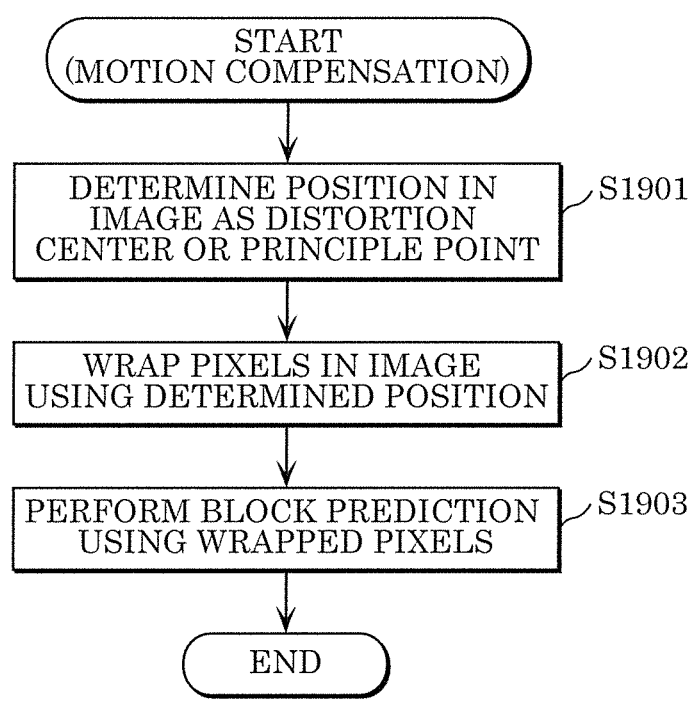
FIG. 16 is a flow chart illustrating an inter prediction process or motion compensation according to Embodiment 2.

FIG. 16 is a flow chart illustrating an adapted inter prediction process when an image is identified to be captured using a non rectilinear lens or when an image is identified to be processed to be rectilinear or when an image is identified as stitched from more than one image. As illustrated in FIG. 16, based on the parameters written in a header, the encoder determines a position in an image as the distortion center or principle point in step S1901. FIG. 17 illustrates an example of barrel distortion caused by a fisheye lens. Note that a fisheye lens is one example of a wide angle lens. The magnification decreases along a focal axis as it moves further away from the distortion center. Thus, based on the distortion center, in step S1902, the encoder can wrap pixels in an image to correct the distortion or reverse the correction done to make an image rectilinear. In other words, the encoder performs an image correction process (i.e., a wrapping process) on distorted blocks in an image to be encoded. Finally, based on the wrapped image pixels, the encoder can perform a block prediction to derive a block of prediction samples based on the wrapped image pixels in step S1903. Note that a wrapping process or wrapping according to this embodiment is a process that arranges or rearranges pixels, blocks, or images. The encoder may also return the prediction block, which is a predicted block, to its original distorted state before undergoing the image correction process, and the distorted prediction block may be used as a prediction image including a distorted block to be processed. Note that the prediction image and block to be processed correspond to the prediction signal and the current block according to Embodiment 1.

Another example of an adapted inter prediction process includes an adapted motion vector process. The motion vectors' resolution is lower for image blocks further away from the distortion center than the blocks nearer to the distortion center. For example, image blocks further away from the distortion center may have motion vectors' precision up to half-pixel precision, while image blocks nearer to the distortion center may have higher motion vectors' precision up to one-eight pixel precisions. Because of differences between adapted motion vector precisions arise based on the image block position, precision of the motion vectors encoded in a bitstream may be adaptive depending on the end position or/and start position of the motion vectors. In other words, using parameters, the encoder may change motion vector precisions based on block position.

Another example of an adapted inter prediction process includes an adapted motion compensation process where pixels from different views may be used to predict image samples from current view based on a layout parameter written in a header. For example, depending on the 360 image format such as equirectangular projection, Cubic-3×2 layout, Cubic-4×3 layout, the arrangement of the images within the stitched image is different. The layout parameter will be used to identify the continuity of the images in certain directions based on the arrangement of the images. During the motion compensation process, pixels from other images or views can be used for inter prediction process and these images or views are identified by the layout parameter. Some images or pixels in the images may also be required to be rotated to ensure the continuity.

In other words, the encoder may perform a process for ensuring continuity. For example, when encoding the stitched image illustrated in FIG. 15, the encoder may perform a wrapping process based on those parameters. More specifically, among the five images included in the stitched image (i.e., images A through D and the top view), the top view is a 180-degree image, and images A through D are 90-degree images. Accordingly, the space depicted in the top view is continuous with each of the spaces depicted in images A through D, and the space depicted in image A is continuous with the space depicted in image B. However, in the stitched image, the top view is not continuous with images A, C, and D, and image A is not continuous with image B. Thus, the encoder performs the above mentioned wrapping process to improve coding efficiency. Stated differently, the encoder rearranges the images included in the stitched image. For example, the encoder rearranges the images so that image A and image B are continuous. This gives continuity to an object depicted in separated images A and B, making it possible to improve coding efficiency. Note that the wrapping process, which is a process for rearranging or arranging such images, is also referred to as frame packing.

<Padding in Inter Prediction>

Figure 18:
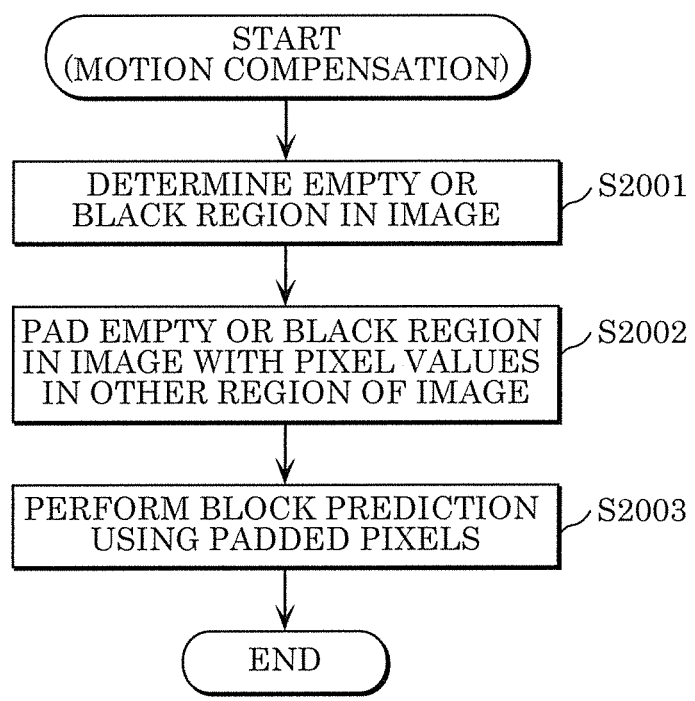
FIG. 18 is a flow chart illustrating a variation of an inter prediction process or motion compensation according to Embodiment 2.

FIG. 18 is a flow chart illustrating a variation of an adapted inter prediction process when an image is identified to be captured using a non rectilinear lens or when an image is identified to be processed to be rectilinear or when an image is identified as stitched from more than one image. As illustrated in FIG. 18, based on the parameters written in a header, the encoder identifies a region of an image as an empty region in step S2001. These empty regions are regions of an image that does not contain captured image pixels and are typically replaced with pre-determined pixel values (e.g. black colored pixels). FIG. 13 illustrates an example of these regions in an image. FIG. 15 illustrates another example of these regions when a plurality of images are stitched together. Next in step S2002 of FIG. 18, the encoder pads the pixels in these identified regions with values from other non empty regions of the image during a motion compensation process. The padded values may be from the nearest neighbor in the non empty regions or the nearest neighbor pixel accordingly to physical three dimensional spaces. Finally in step S2003, the encoder performs a block prediction to produce a block of prediction samples based on the padded values.

<Distortion Correction in Picture Reconstruction>

Figure 19:
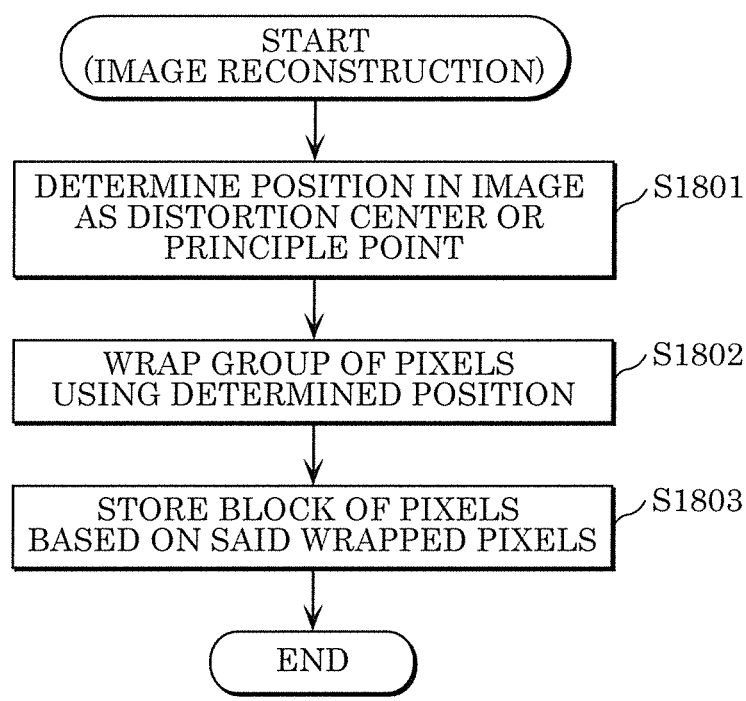
FIG. 19 is a flow chart illustrating a picture reconstruction process according to Embodiment 2.

FIG. 19 illustrates an adapted picture reconstruction process when an image is identified to be captured using a non rectilinear lens or when an image is identified to be processed to be rectilinear or when an image is identified as stitched from more than one image. As illustrated in FIG. 19, based on the parameters written in a header, the encoder determines a position in an image as the distortion center or principle point in step S1801. FIG. 17 illustrates an example of barrel distortion caused by a fisheye lens. The magnification decreases along a focal axis as it moves further away from the distortion center. Thus, based on the distortion center, in step S1802, the encoder can perform a wrapping process on reconstruction pixels in an image to correct the distortion or reverse the correction done to make an image rectilinear. For example, the encoder generates a reconstructed picture by adding a prediction error image generated by inverse transformation and a prediction image. Here, the encoder performs a wrapping process to make the prediction error image and the prediction image rectilinear. Finally, based on the pixels in the image processed with the wrapping process, the encoder stores a block of reconstructed images in memory in step S1803.

<Pixel Replacement in Picture Reconstruction>

Figure 20:
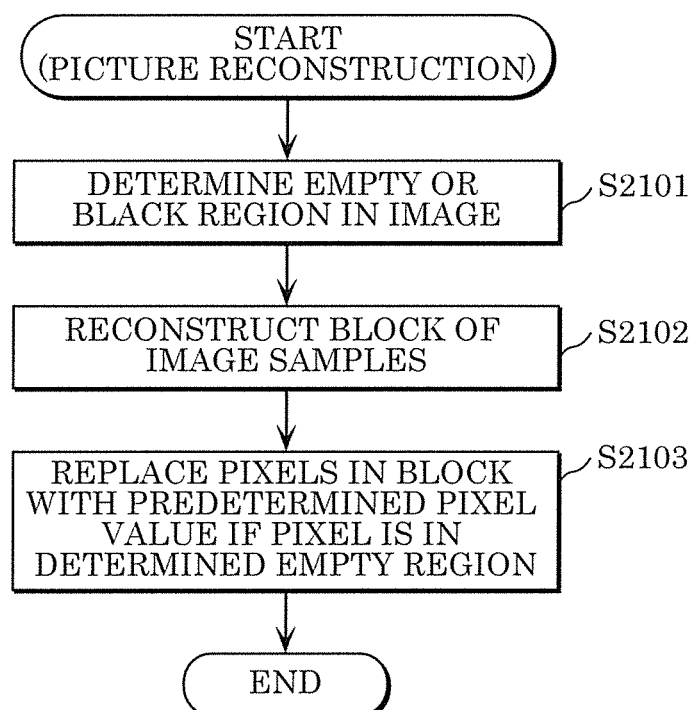
FIG. 20 is a flow chart illustrating a variation of a picture reconstruction process according to Embodiment 2.

FIG. 20 illustrates a variation of an adapted picture reconstruction process when an image is identified to be captured using a non rectilinear lens or when an image is identified to be processed to be rectilinear or when an image is identified as stitched from more than one images. As illustrated in FIG. 20, based on the parameters written in a header, the encoder identifies a region of an image as an empty region in step S2101. These empty regions are regions of an image that does not contain captured image pixels and are typically replaced with pre-determined pixel values (e.g. black colored pixels). FIG. 13 illustrates an example of these regions in an image. FIG. 15 illustrates another example of these regions when a plurality of images are stitched together. Next, in step S2102, the encoder reconstructs a block of image samples.

Then, in step S2103, the encoder replaces the reconstructed pixels in these identified regions with pre-determined pixel values.

<Skipping of Encoding Process>

At step S102 illustrated in FIG. 11, in another possible variation of adaptive video encoding tools, an image encoding process may be skipped. In other words, the encoder may skip an image encoding process based on the written parameter about the layout arrangement of the images and information on the active viewing region based on a user's eye gaze or head direction. Stated differently, the encoder performs a partial encoding process.

Figure 21:
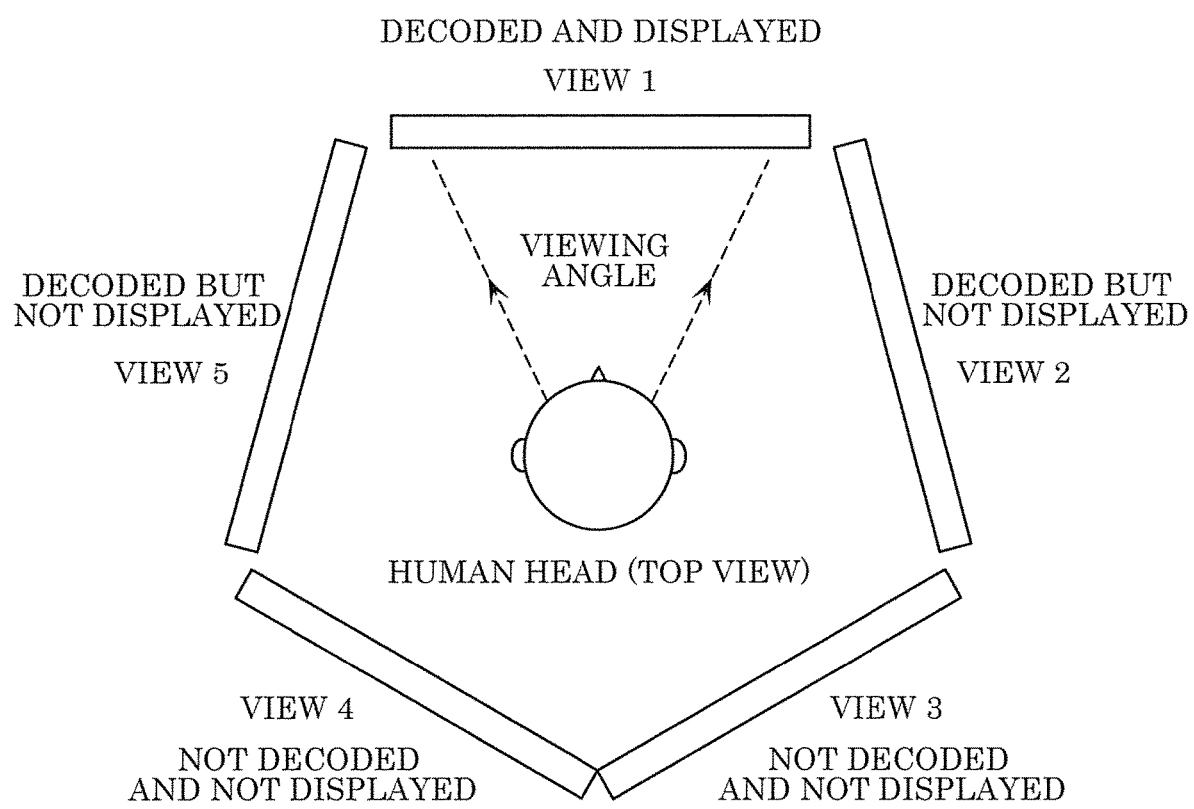
FIG. 21 illustrates one example of a partial encoding process or partial decoding process performed on a stitched image, according to Embodiment 2.

FIG. 21 illustrates an example of a user's eye gaze viewing angle or head direction relative to different views captured by different cameras. As illustrated in FIG. 21, the viewing angle of the user is within the image captured by camera from view 1 only. In this example, the images from other views do not require encoding as they are outside of the user's viewing angle and thus the encoding processes or transmission process can be skipped for these images to reduce the complexity for encoding or to reduce the transmission bitrate for the compressed images. In another possible example as illustrated in FIG. 21, images from view 5 and view 2 are also encoded and transmitted as they are physically closer to the active view (view 1). These images are not displayed to the viewer/user at the current time but they are displayed to the viewer/user when the viewer changes his/her head direction. These images are used to improve the user's viewing experience when he/she changes his/her head direction.

Figure 22:
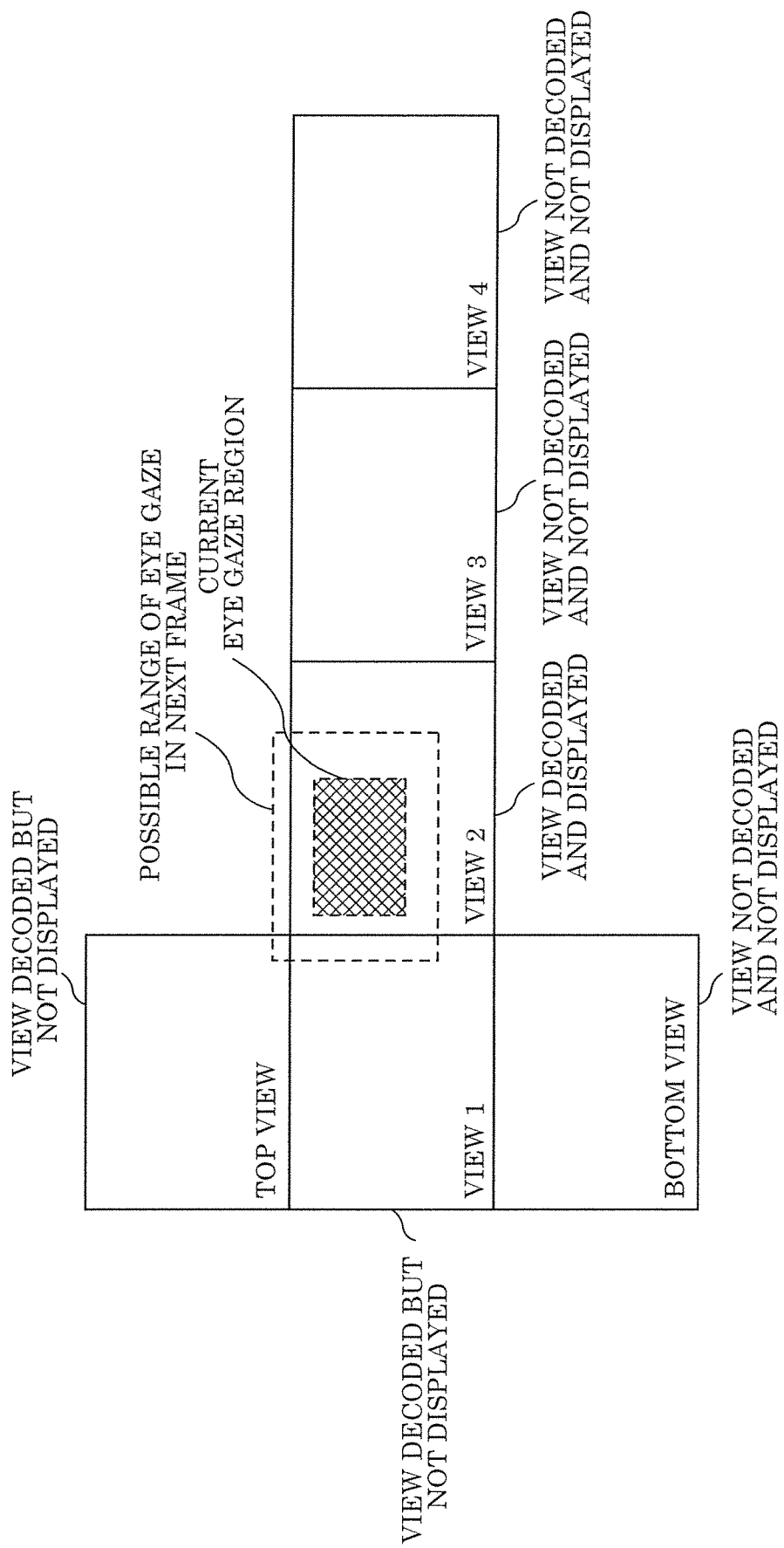
FIG. 22 illustrates another example of a partial encoding process or partial decoding process performed on a stitched image, according to Embodiment 2.

FIG. 22 illustrates another example of a user's eye gaze viewing angle or head direction relative to different views captured by different cameras. In this example, the active eye gaze viewing region is within the images from view 2. Therefore, images from view 2 are encoded and displayed to the user. In the same example, the encoder defines a wider region as the possible range of eye gaze region for future frames in anticipation of possible motion range of the viewer's head in near future. The images from the views (other than view 2) that are within the wider future eye gaze region but not within the current active eye gaze region are also encoded and transmitted by the encoder to allow faster rendering of the views at the viewer's end. In other words, in addition to images from view 2, images from the top view and view 1 that at least partially overlap the possible eye gaze region illustrated in FIG. 22 are also encoded and transmitted. The images from the rest of the views (view 3, view 4 and the bottom view) are not encoded and the encoding processes for these images are skipped.

[Encoder]

Figure 23:
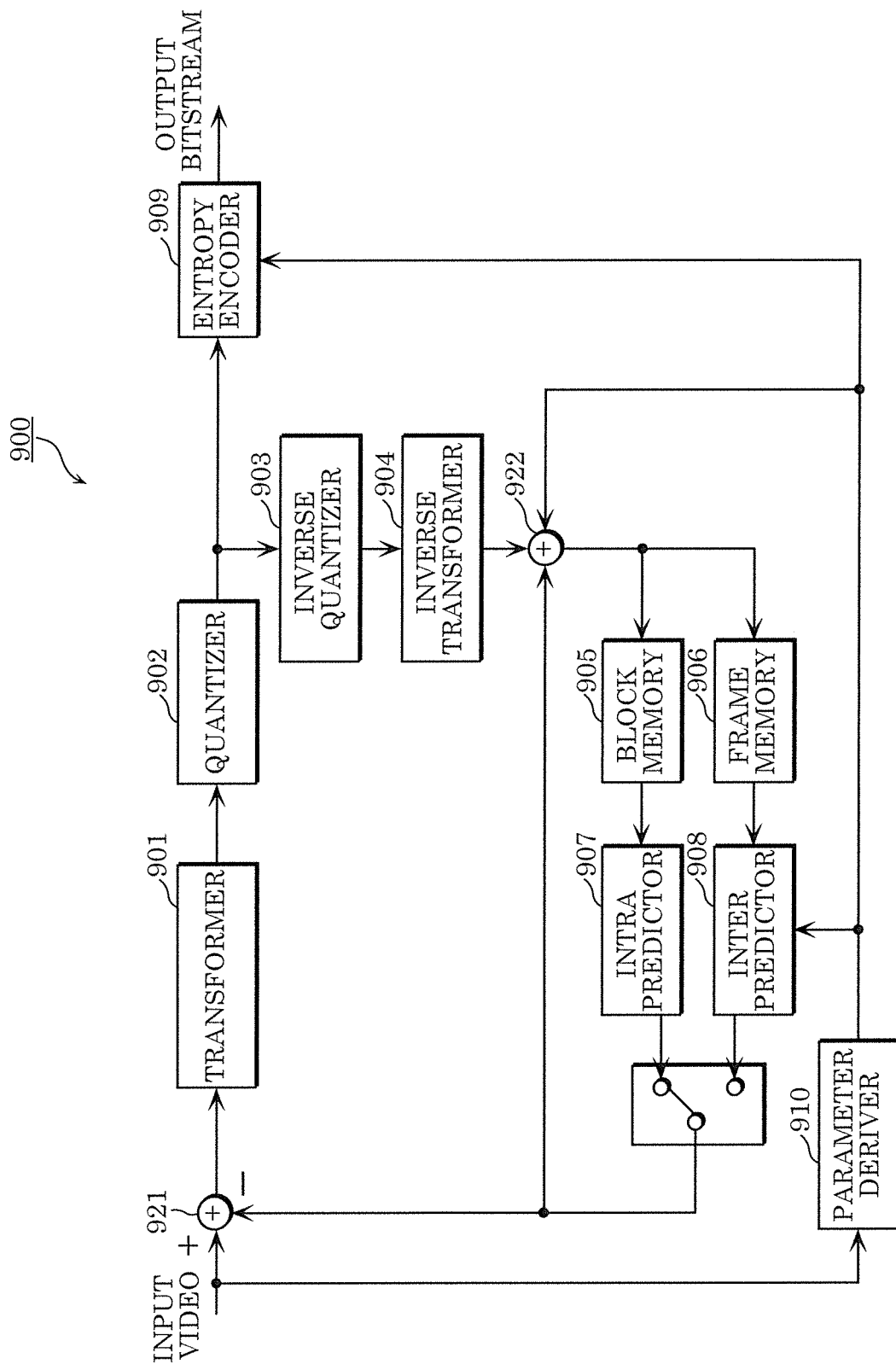
FIG. 23 is a block diagram of an encoder according to Embodiment 2.

FIG. 23 is a block diagram illustrating a configuration of an encoder that encodes a video according to this embodiment.

Encoder 900 is a device for encoding an input video/ image bitstream on a block-by-block basis so as to generate an encoded output bitstream, and corresponds to encoder 100 according to Embodiment 1. As illustrated in FIG. 23, encoder 900 includes transformer 901, quantizer 902, inverse quantizer 903, inverse transformer 904, block memory 905, frame memory 906, intra predictor 907, inter predictor 908, subtractor 921, adder 922, entropy encoder 909, and parameter deriver 910.

An image of input video (i.e., a current block) is inputted to subtractor 921, and the added value is outputted to transformer 901. Stated differently, subtractor 921 calculates a prediction error by subtracting a prediction image from the current block. Transformer 901 transforms the added values (i.e., prediction error) into frequency coefficients, and outputs the resulting frequency coefficients to quantizer 902. Quantizer 902 quantizes the inputted frequency coefficients, and outputs the resulting quantized values to inverse quantizer 903 and entropy encoder 909.

Inverse quantizer 903 inversely quantizes the sample values (i.e., quantized values) outputted from quantizer 902, and outputs the frequency coefficients to inverse transformer 904. Inverse transformer 904 performs an inverse frequency transform on the frequency coefficients so as to transform the frequency coefficients into sample values, i.e., pixel values, and outputs the resulting sample values to adder 922.

Parameter deriver 910 derives, from an image, parameters related to an image correction process, parameters related to a camera, or parameters related to a stitching process, and outputs the parameters to inter predictor 908, adder 922, and entropy encoder 909. For example, the input video may include the parameters, and in such cases, parameter deriver 910 extracts and outputs the parameters included in the video. Alternatively, the input video may include parameters functioning as a base for deriving such parameters. In such cases, parameter deriver 910 extracts the base parameters included in the video, and transforms and outputs the extracted base parameters as the above mentioned parameters.

Adder 922 adds sample values output form inverse transformer 904 to pixel values of the prediction image output from intra predictor 907 or inter predictor 908. Stated differently, adder 922 performs a picture reconstruction process to generate a reconstructed picture. Adder 922 outputs the resulting added values to block memory 905 or frame memory 906 in order to perform further prediction.

Intra predictor 907 performs intra prediction. In other words, intra predictor 907 estimates an image of the current block using reconstructed pictures stored in block memory 905 that are included the same picture as the picture of the current block. Inter predictor 908 performs inter prediction. In other words, inter predictor 908 estimates an image of the current block using reconstructed pictures stored in frame memory 906 that are included different pictures than the picture of the current block.

Here, in this embodiment, inter predictor 908 and adder 922 adapt processing based on parameters derived by parameter deriver 910. In other words, inter predictor 908 and adder 922 perform, as processes performed by the above mentioned adaptive video encoding tools, processes that conform to the flow charts illustrated in FIG. 16, FIG. 18, FIG. 19, and FIG. 20.

Entropy encoder 909 encodes quantized values output from quantizer 902 and parameters derived by parameter deriver 910, and outputs a bitstream. In other words, entropy encoder 909 writes those parameters into a header of a bitstream.

[Decoding Process]

Figure 24:
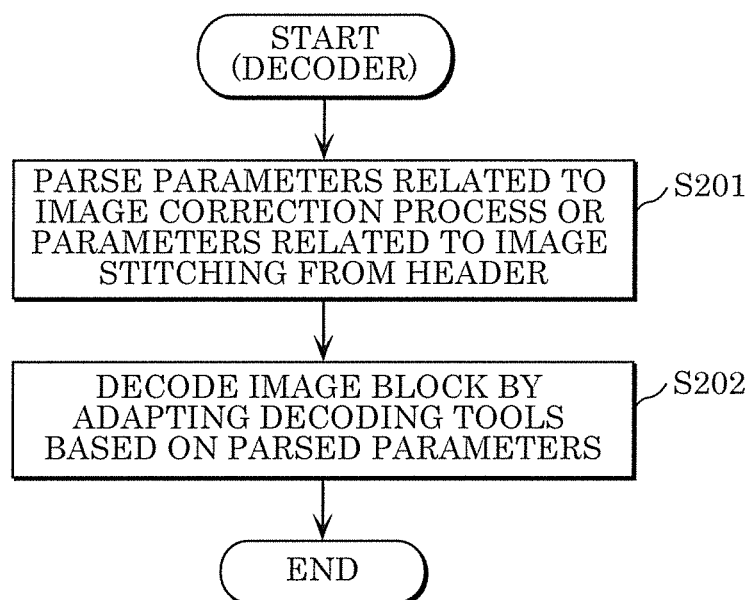
FIG. 24 is a flow chart illustrating one example of a video decoding process according to Embodiment 2.

FIG. 24 is a flow chart illustrating one example of a video decoding process according to this embodiment.

In step S201, the decoder parses a set of parameters from a header. FIG. 12 illustrates the possible locations of the above mentioned header in a compressed video bitstream. The parsed parameters include one or more parameters related to an image correction process.

<Examples of Image Correction Process Parameters>

As illustrated in FIG. 13, the captured image may be distorted due to the characteristics of the lens used during the capturing of the image. An image correction process was used to rectify the captured image to rectilinear. The parsed parameters include such parameters to identify or describe the image correction process used. Examples of parameters used in the image correction process include parameters configuring a mapping table to map input image pixels to the intended output pixel values of the image correction process. These parameters may include weight parameters for one or more interpolation process or/and position parameters identifying the locations of the input and output pixels in a picture. In one possible implementation example of the image correction process, the mapping table for the image correction process may be used for all the pixels in the corrected image.

Other examples of parameters used to describe the image correction process include a selection parameter to select one out of a plurality of pre-defined correction algorithms, a direction parameter to select one out of a plurality of pre-determined directions of the correction algorithms or/and calibration parameters to calibrate or fine tune the correction algorithms. For example, when there is a plurality of pre-defined correction algorithms (e.g., different algorithms are used for different types of lenses), the selection parameter is used to select one of these pre-defined algorithms. For example, when there is more than one direction that the correction algorithms can be applied in (e.g., image correction process can be perform horizontally, vertically or both directions), the direction parameter selects one of these pre-defined directions. For example, when the image correction process can be calibrated, the calibration parameters allow the adjustment of the image correction process to suit different types of lenses.

<Examples of Stitching Process Parameters>

The parsed parameters may also include one or more parameters related to a stitching process. As illustrated in FIG. 14 and FIG. 15, an image to be input into the decoder may be the result of a stitching process that combines a plurality of images from different cameras. The parsed parameters include, for example, parameters that provide information related to the stitching process, such as the number of cameras, the distortion centers or principle center of each camera, the level of distortion, etc. Another example of the parameters describing the stitching process include parameters that identify the locations of the stitched images that are generated from overlapping pixels from a plurality of images. Each of these images may contain pixels that may appear in other images as the angles of the cameras may have overlapping regions. During the stitching process, these overlapping pixels are processed and reduced to produce the stitched image.

Another example of the parameters describing the stitching process include parameters that identify the layout of the stitched image. For example, depending on the 360 image format such as equirectangular projection, Cubic-3×2 layout, Cubic-4×3 layout, the arrangement of the images within the stitched image is different. The layout parameter, which is one example of the above mentioned parameters, will be used to identify the continuity of the images in certain directions based on the arrangement of the images. During the motion compensation process, pixels from other images or views can be used for inter prediction process and these images or views are identified by the layout parameter. Some images or pixels in the images may also be required to be rotated to ensure the continuity.

Other examples of the parameters include camera and lens parameters (e.g., focal length, principle point, scale factor, image sensor format used in the camera, etc). More examples of the parameters include the physical information related to the placement of the camera (e.g. the position of the camera, the angle of the camera, etc).

Next, in step S202, the decoder decodes an image by adaptive video decoding tools based on these parsed parameters. The adaptive video decoding tools include an inter prediction process. The set of adaptive video decoding tools may also include a picture reconstruction process. Note that the video decoding tools and adaptive video decoding tools may be the same tools as, or tools corresponding to, the above mentioned video encoding tools and adaptive video encoding tools.

<Distortion Correction in Inter Prediction>

FIG. 16 is a flow chart illustrating an adapted inter prediction process when an image is identified to be captured using a non rectilinear lens or when an image is identified to be processed to be rectilinear or when an image is identified as stitched from more than one image. As illustrated in FIG. 16, based on the parameters written in a header, the decoder determines a position in an image as the distortion center or principle point in step S1901. FIG. 17 illustrates an example of barrel distortion caused by a fisheye lens. The magnification decreases along a focal axis as it moves further away from the distortion center. Thus, based on the distortion center, in step S1902, the decoder can perform a wrapping process on reconstruction pixels in an image to correct the distortion or reverse the correction done to make an image rectilinear. In other words, the decoder performs an image correction process (i.e., a wrapping process) on distorted blocks in an image to be decoded. Finally, based on the wrapped image pixels, the decoder can perform a block prediction to derive a block of prediction samples based on the wrapped image pixels in step S1903. The decoder may also return the prediction block, which is a predicted block, to its original distorted state before undergoing the image correction process, and the distorted prediction block may be used as a prediction image including a distorted block to be processed.

Another example of an adapted inter prediction process includes an adapted motion vector process. The motion vectors' resolution is lower for image blocks further away from the distortion center than the blocks nearer to the distortion center. For example, image blocks further away from the distortion center may have motion vectors' precision up to half-pixel precision, while image blocks nearer to the distortion center may have higher motion vectors' precision up to one-eight pixel precisions. Because of adapted motion vector precisions difference based on the image block position, precision of the motion vectors encoded in a bitstream may be adaptive depending on the end position or/and start position of the motion vectors. In other words, using parameters, the decoder may change motion vector precisions based on block position.

Another example of an adapted inter prediction process includes an adapted motion compensation process where pixels from different views may be used to predict image samples from current view based on a layout parameter written in a header. For example, depending on the 360 image format such as equirectangular projection, Cubic-3×2 layout, Cubic-4×3 layout, the arrangement of the images within the stitched image is different. The layout parameter will be used to identify the continuity of the images in certain directions based on the arrangement of the images. During the motion compensation process, pixels from other images or views can be used for inter prediction process and these images or views are identified by the layout parameter. Some images or pixels in the images may also be required to be rotated to ensure the continuity.

In other words, the decoder may perform a process for ensuring continuity. For example, when decoding the stitched image illustrated in FIG. 15, the decoder may perform a wrapping process based on those parameters. More specifically, as described above with respect to the encoder, the decoder rearranges the images so that image A and image B are continuous. This gives continuity to an object depicted in separated images A and B, making it possible to improve coding efficiency.

<Padding in Inter Prediction>

FIG. 18 is a flow chart illustrating a variation of an adapted inter prediction process when an image is identified to be captured using a non rectilinear lens or when an image is identified to be processed to be rectilinear or when an image is identified as stitched from more than one image. As illustrated in FIG. 18, based on the parameters parsed from a header, the decoder identifies a region of an image as an empty region in step S2001. These empty regions are regions of an image that does not contain captured image pixels and are typically replaced with pre-determined pixel values (e.g. black colored pixels). FIG. 13 illustrates an example of these regions in an image. FIG. 15 illustrates another example of these regions when a plurality of images are stitched together. Next in step S2002 of FIG. 18, the decoder pads the pixels in these identified regions with values from other non empty regions of the image during a motion compensation process. The padded values may be from the nearest neighbor in the non empty regions or the nearest neighbor pixel accordingly to physical three dimensional spaces. Finally in step S2003, the decoder performs a block prediction to produce a block of prediction samples based on the padded values.

<Distortion Correction in Picture Reconstruction>

FIG. 19 illustrates an adapted picture reconstruction process when an image is identified to be captured using a non rectilinear lens or when an image is identified to be processed to be rectilinear or when an image is identified as stitched from more than one image. As illustrated in FIG. 19, based on the parameters parsed from a header, the decoder determines a position in an image as the distortion center or principle point in step S1801. FIG. 17 illustrates an example of barrel distortion caused by a fisheye lens. The magnification decreases along a focal axis as it moves further away from the distortion center. Thus, based on the distortion center, in step S1802, the decoder can perform a wrapping process on reconstruction pixels in an image to correct the distortion or reverse the correction done to make an image rectilinear. For example, the decoder generates a reconstructed picture by adding a prediction error image generated by inverse transformation and a prediction image. Here, the decoder performs a wrapping process to make the prediction error image and the prediction image rectilinear.

Finally, based on the pixels in the image processed with the wrapping process, the decoder stores a block of reconstructed images in memory in step S1803.

<Pixel Replacement in Picture Reconstruction>

FIG. 20 illustrates a variation of an adapted picture reconstruction process when an image is identified to be captured using a non rectilinear lens or when an image is identified to be processed to be rectilinear or when an image is identified as stitched from more than one images. As illustrated in FIG. 20, based on the parameters parsed from a header, the decoder identifies a region of an image as an empty region in step S2001. These empty regions are regions of an image that does not contain captured image pixels and are typically replaced with pre-determined pixel values (e.g. black colored pixels). FIG. 13 illustrates an example of these regions in an image. FIG. 15 illustrates another example of these regions when a plurality of images are stitched together. Next, in step S2102, the decoder reconstructs a block of image samples.

Then, in step S2103, the decoder replaces the reconstructed pixels in these identified regions with pre-determined pixel values.

<Skipping of Decoding Process>

At step S202 illustrated in FIG. 24, in another possible variation of adaptive video decoding tools, an image decoding process may be skipped. In other words, the decoder may skip an image decoding process based on the parsed parameter about the layout arrangement of the images and information on the active viewing region based on a user's eye gaze or head direction. Stated differently, the decoder performs a partial decoding process.

FIG. 21 illustrates an example of a user's eye gaze viewing angle or head direction relative to different views captured by different cameras. As illustrated in FIG. 21, the viewing angle of the user is within the image captured by camera from view 1 only. In this example, the images from other views do not require decoding as they are outside of the user's viewing angle and thus the decoding processes or display process can be skipped for these images to reduce the complexity for decoding or to reduce the transmission bitrate for the compressed images. In another possible example as illustrated in FIG. 21, images from view 5 and view 2 are also decoded as they are physically closer to the active view (view 1). These images are not displayed to the viewer/user at the current time but they are displayed to the viewer/user when the viewer changes his/her head direction. By reducing the time that a view is decoded and displayed according to the motion of the user's head, these images are displayed as fast as possible to improve the user's viewing experience when he/she changes his/her head direction.

FIG. 22 illustrates another example of a user's eye gaze viewing angle or head direction relative to different views captured by different cameras. In this example, the active eye gaze viewing region is within the images from view 2. Therefore, images from view 2 are decoded and displayed to the user. In the same example, the decoder defines a wider region as the possible range of eye gaze region for future frames in anticipation of possible motion range of the viewer's head in near future. The decoder also decodes the images from the views (other than view 2) that are within the wider future eye gaze region but not within the current active eye gaze region. In other words, in addition to images from view 2, images from the top view and view 1 that at least partially overlap the possible eye gaze region illustrated in FIG. 22 are also decoded. With this, images are displayed to allow faster rendering of the views at the viewer's end. The images from the rest of the views (view 3, view 4 and the bottom view) are not decoded and the decoding processes for these images are skipped.

[Decoder]

Figure 25:
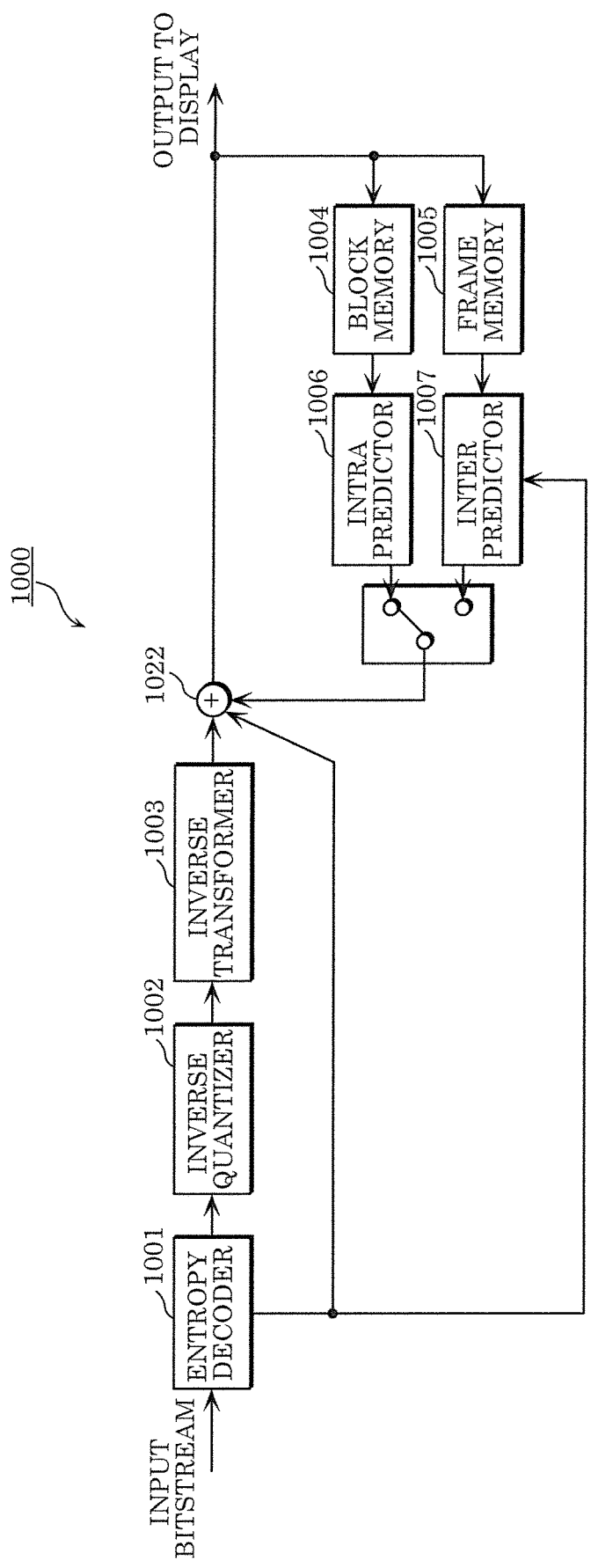
FIG. 25 is a block diagram of a decoder according to Embodiment 2.

FIG. 25 is a block diagram illustrating a configuration of a decoder that decodes a video according to this embodiment.

Decoder 1000 is a device for decoding an input coded video (i.e., input bitstream) on a block-by-block basis to generate a decoded video, and corresponds to decoder 200 according to Embodiment 1. As illustrated in FIG. 25, decoder 1000 includes entropy decoder 1001, inverse quantizer 1002, inverse transformer 1003, block memory 1004, frame memory 1005, adder 1022, intra predictor 1006, and inter predictor 1007.

An input bitstream is inputted to entropy decoder 1001. Thereafter, entropy decoder 1001 entropy decodes the input bitstream, and outputs the entropy decoded values (i.e., quantized values) to inverse quantizer 1002. Entropy decoder 1001 also parses parameters from the input bitstream and outputs the parameters to inter predictor 1007 and adder 1022.

Inverse quantizer 1002 inversely quantizes the entropy decoded values, and outputs the frequency coefficients to inverse transformer 1003. Inverse transformer 1003 performs an inverse frequency transform on the frequency coefficients to transform the frequency coefficients into sample values (i.e., pixel values), and outputs the resulting pixel values to adder 1022. Adder 1022 adds the obtained pixel values to pixel values of the prediction image output from intra predictor 1006 or inter predictor 1007. Stated differently, adder 1022 performs a picture reconstruction process to generate a reconstructed picture. Adder 1022 outputs the values obtained via the adding (i.e., the decoded image) to a display, and outputs the obtained values to block memory 1004 or frame memory 1005 in order to perform further prediction.

Intra predictor 1006 performs intra prediction. In other words, intra predictor 1006 estimates an image of the current block using reconstructed pictures stored in block memory 1004 that are included the same picture as the picture of the current block. Inter predictor 1007 performs inter prediction. In other words, inter predictor 1007 estimates an image of the current block using reconstructed pictures stored in frame memory 1005 that are included different pictures than the picture of the current block.

Here, in this embodiment, inter predictor 1007 and adder 1022 adapt processing based on parsed parameters. In other words, inter predictor 1007 and adder 1022 perform, as processes performed by the above mentioned adaptive video decoding tools, processes that conform to the flow charts illustrated in FIG. 16, FIG. 18, FIG. 19, and FIG. 20.

Embodiment 3

[Encoding Process]

Figure 26:
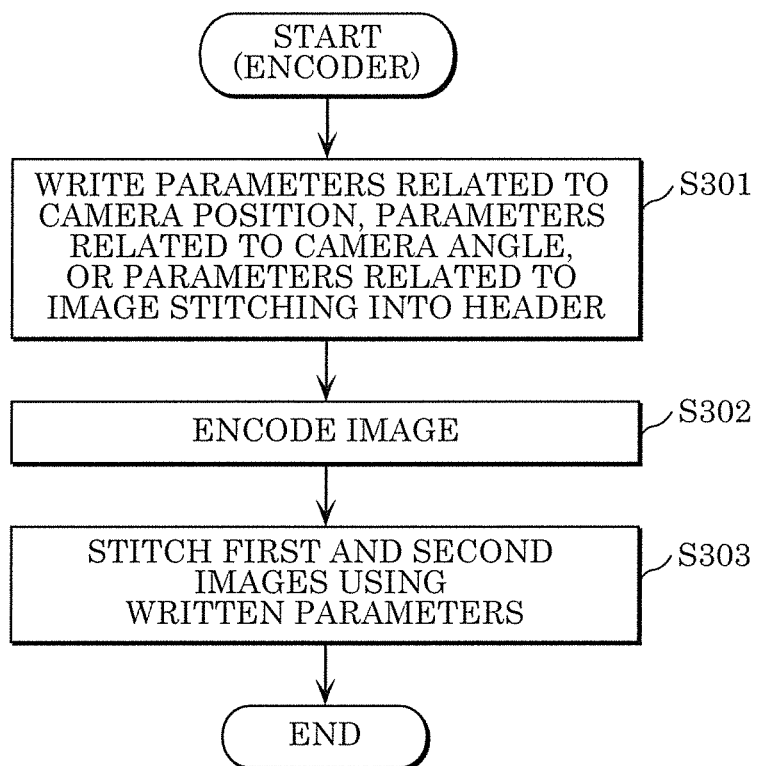
FIG. 26 is a flow chart illustrating one example of a video encoding process according to Embodiment 3.

A method of performing a video encoding process on an image captured using a non rectilinear lens according to Embodiment 3 of the present disclosure as illustrated in FIG. 26 will be described.

FIG. 26 is a flow chart illustrating one example of a video encoding process according to this embodiment.

In step S301, the encoder writes a set of parameters into a header. FIG. 12 illustrates the possible locations of the above mentioned header in a compressed video bitstream. The written parameters include one or more parameters related to camera position. The written parameters may also include one or more parameters related to camera angle or one or more parameters related to instructions on how to stitch a plurality of images.

Other examples of the parameters include camera and lens parameters (e.g., focal length, principle point, scale factor, image sensor format used in the camera, etc). More examples of the parameters include the physical information related to the placement of the camera (e.g. the position of the camera, the angle of the camera, etc).

In this embodiment, the above mentioned parameters written into the header are also referred to as camera parameters or stitching parameters FIG. 15 shows an example of a method to stitch images from more than one camera together. FIG. 14 shows another example of a method to stitch images from more than one camera.

Next, in step S302, the encoder encodes an image. The encoding process in S302 may also be adapted based on a stitched image. For example, the reference picture used by the encoder in the motion compensation process can be a larger stitched image instead of an image with the same size as decoded image (i.e., an unstitched image).

And finally in step S303, based on the written parameters, the encoder stitches a first image, which is the reconstructed image encoded in step S302, with a second image to create a larger image. The stitched image may be used to predict future frames (i.e., inter prediction or motion compensation).

Figure 27:
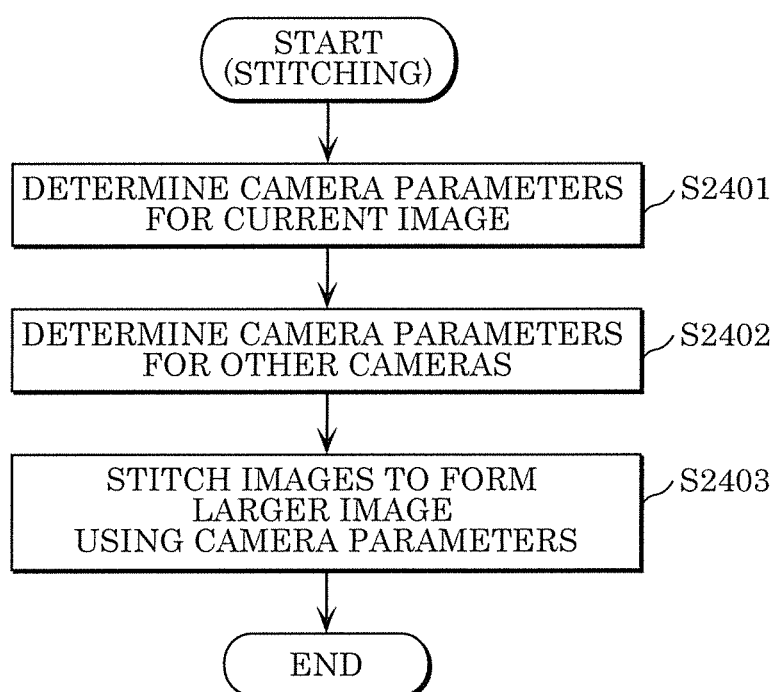
FIG. 27 is a flow chart illustrating one example of a stitching process according to Embodiment 3.

FIG. 27 is a flow chart illustrating a stitching process using the parameters written in the header. In step S2401, the encoder determines the camera parameters or stitching parameters from the written parameters for the current image. Similarly, in step S2402, the encoder determines the camera parameters or stitching parameters from the written parameters for other images. And finally in step S2403, the encoder stitches the images to form a larger image using these determined parameters. These determined parameters are written in the header. Note that the encoder may perform a wrapping process or frame packing process for arranging or rearranging images to improve coding efficiency.

[Encoder]

Figure 28:
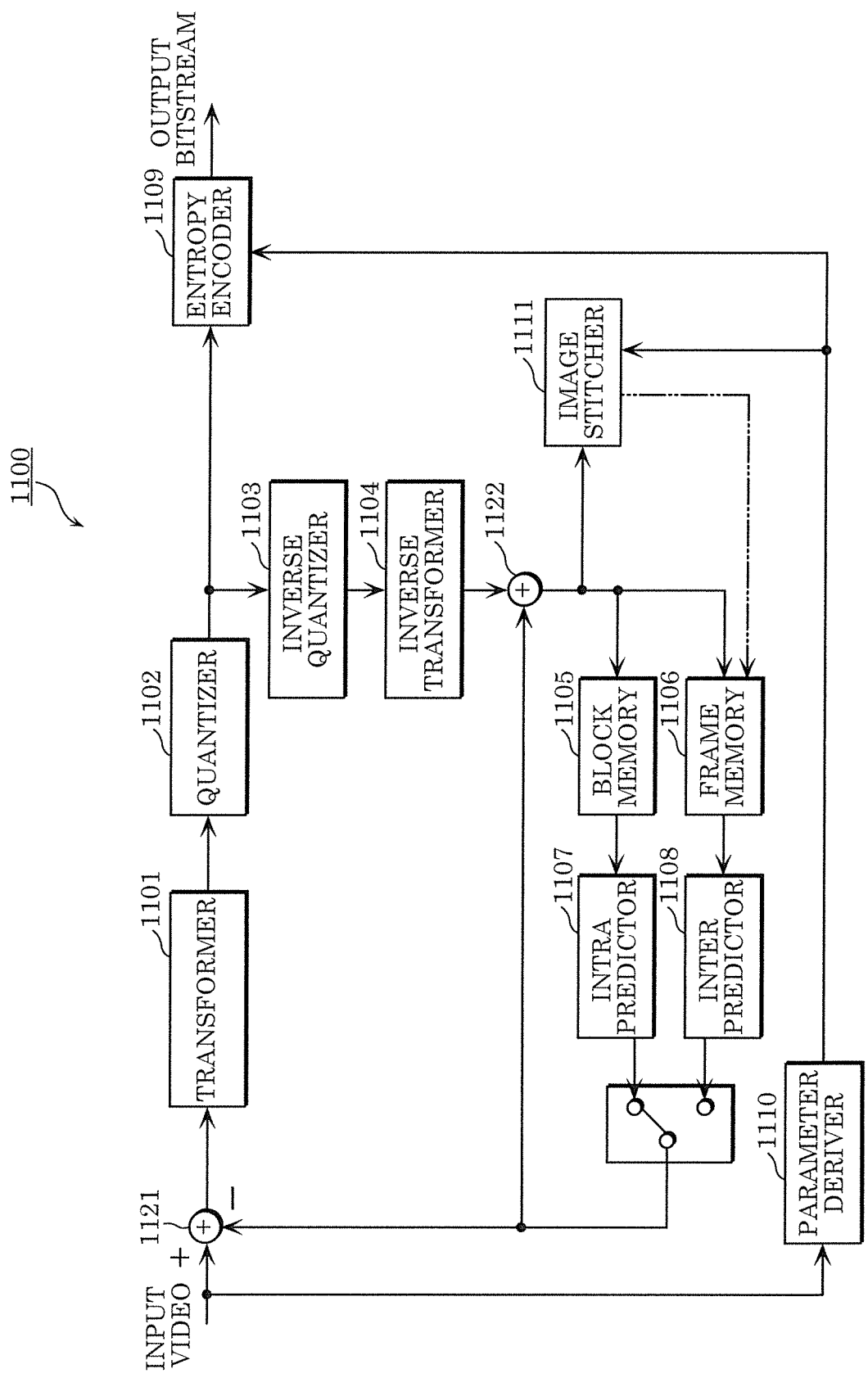
FIG. 28 is a block diagram of an encoder according to Embodiment 3.

FIG. 28 is a block diagram illustrating a configuration of an encoder that encodes a video according to this embodiment.

Encoder 1100 is a device for encoding an input video/image bitstream on a block-by-block basis so as to generate an encoded output bitstream, and corresponds to encoder 100 according to Embodiment 1. As illustrated in FIG. 28, encoder 1100 includes transformer 1101, quantizer 1102, inverse quantizer 1103, inverse transformer 1104, block memory 1105, frame memory 1106, intra predictor 1107, inter predictor 1108, subtractor 1121, adder 1122, entropy encoder 1109, parameter deriver 1110, and image stitcher 1111.

An image of input video (i.e., a current block) is inputted to subtractor 1121, and the added value is outputted to transformer 1101. Stated differently, subtractor 1121 calculates a prediction error by subtracting a prediction image from the current block. Transformer 1101 transforms the added values (i.e., prediction error) into frequency coefficients, and outputs the resulting frequency coefficients to quantizer 1102. Quantizer 1102 quantizes the inputted frequency coefficients, and outputs the resulting quantized values to inverse quantizer 1103 and entropy encoder 1109.

Inverse quantizer 1103 inversely quantizes the sample values (i.e., quantized values) outputted from quantizer 1102, and outputs the frequency coefficients to inverse transformer 1104. Inverse transformer 1104 performs an inverse frequency transform on the frequency coefficients so as to transform the frequency coefficients into sample values, i.e., pixel values, and outputs the resulting sample values to adder 1122.

Adder 1122 adds the pixel values output from inverse transformer 1104 to pixel values of the prediction image output from intra predictor 1107 or inter predictor 1108. Adder 1122 outputs the resulting added values to block memory 1105 or frame memory 1106 in order to perform further prediction.

Similar to Embodiment 1, parameter deriver 1110 derives, from an image, parameters related to a stitching process or parameters related to a camera, and outputs the parameters to image stitcher 1111 and entropy encoder 1109. In other words, parameter deriver 1110 executes the processes in steps S2401 and S2402 illustrated in FIG. 27. For example, the input video may include the parameters, and in such cases, parameter deriver 1110 extracts and outputs the parameters included in the video. Alternatively, the input video may include parameters functioning as a base for deriving such parameters. In such cases, parameter deriver 1110 extracts the base parameters included in the video, and transforms and outputs the extracted base parameters as the above mentioned parameters.

As illustrated in step S303 in FIG. 26 and step S2403 in FIG. 27, image stitcher 1111 uses the parameters to stitch the reconstructed current image other images. Thereafter, image stitcher 1111 outputs the stitched image to frame memory 1106.

Intra predictor 1107 performs intra prediction. In other words, intra predictor 1107 estimates an image of the current block using reconstructed pictures stored in block memory 1105 that are included the same picture as the picture of the current block. Inter predictor 1108 performs inter prediction. In other words, inter predictor 1108 estimates an image of the current block using reconstructed pictures stored in frame memory 1106 that are included different pictures than the picture of the current block. Here, inter predictor 1108 may reference, as a reference image, a large image stored in frame memory 1106 that is obtained by image stitcher 1111 stitching a plurality of images together.

Entropy encoder 1109 encodes quantized values output from quantizer 1102, obtains parameters from parameter deriver 1110, and outputs the parameters to the bitstream. In other words, entropy encoder 1109 entropy encodes the quantized values and parameters, and writes those parameters into a header of a bitstream.

[Decoding Process]

Figure 29:
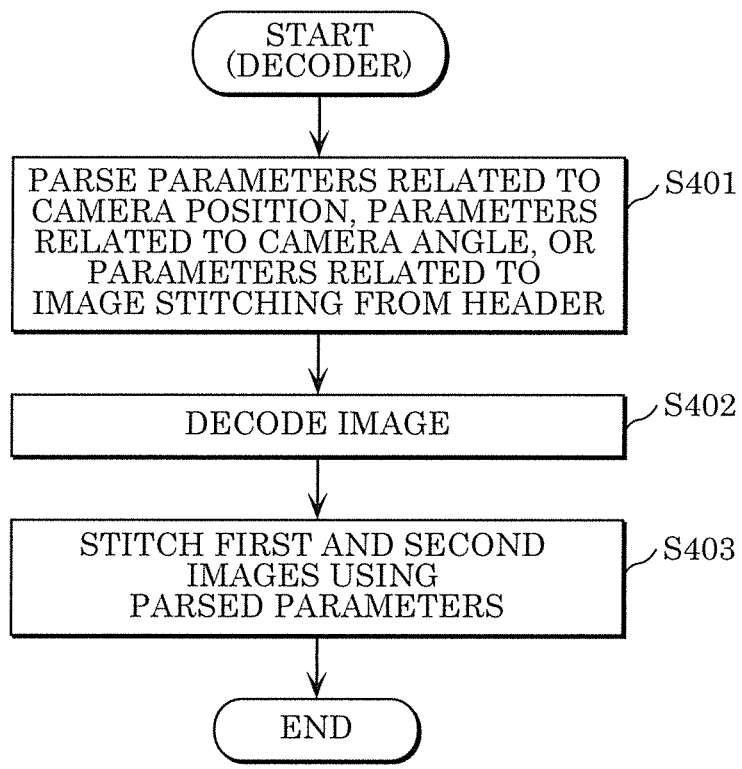
FIG. 29 is a flow chart illustrating one example of a video decoding process according to Embodiment 3.

FIG. 29 is a flow chart illustrating one example of a video decoding process according to this embodiment.

In step S401, the decoder parses a set of parameters from a header. FIG. 12 illustrates the possible locations of the above mentioned header in a compressed video bitstream. The parsed parameters include one or more parameters related to camera position. The parsed parameters may also include one or more parameters related to camera angle or one or more parameters related to instructions on how to stitch a plurality of images. Other examples of the parameters include camera and lens parameters (e.g., focal length, principle point, scale factor, image sensor format used in the camera, etc). More examples of the parameters include the physical information related to the placement of the camera (e.g. the position of the camera, the angle of the camera, etc).

FIG. 15 shows an example of a method to stitch images from more than one camera together. FIG. 14 shows another example of a method to stitch images from more than one camera.

Next, in step S402, the decoder decodes an image. The decoding process in S402 may also be adapted based on a stitched image. For example, the reference picture used by the decoder in the motion compensation process can be a larger stitched image instead of an image with the same size as decoded image (i.e., an unstitched image).

And finally in step S403, based on the parsed parameters, the decoder stitches a first image, which is the image reconstructed in step S402, with a second image to create a larger image. The stitched image may be used to predict future images (i.e., inter prediction or motion compensation).

FIG. 27 is a flow chart illustrating a stitching process using the parsed parameters. In step S2401, the decoder determines the camera parameters or stitching parameters by parsing the parameters from the header for the current image. Similarly, in step S2402, the decoder determines the camera parameters or stitching parameters by parsing the parameters from the header for the other images. And finally in step S2403, the decoder stitches the images to form a larger image using these parsed parameters.

[Decoder]

Figure 30:
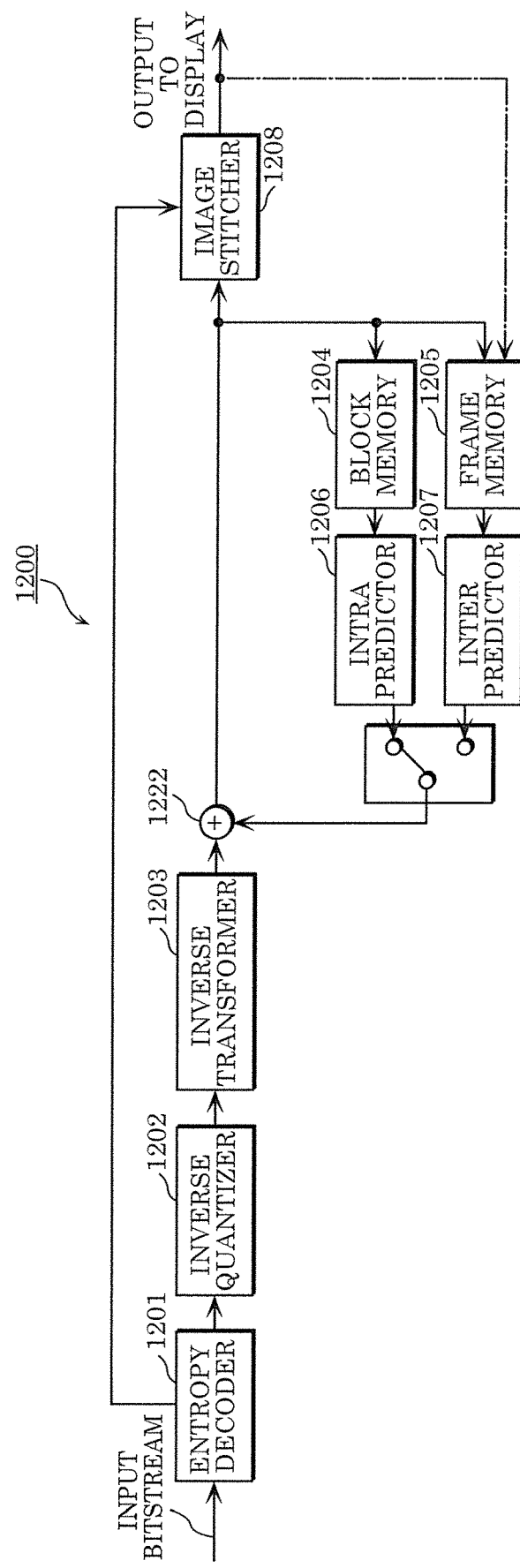
FIG. 30 is a block diagram of a decoder according to Embodiment 3.

FIG. 30 is a block diagram illustrating a configuration of a decoder that decodes a video according to this embodiment.

Decoder 1200 is a device for decoding an input coded video (i.e., input bitstream) on a block-by-block basis to output a decoded video, and corresponds to decoder 200 according to Embodiment 1. As illustrated in FIG. 30, decoder 1200 includes entropy decoder 1201, inverse quantizer 1202, inverse transformer 1203, block memory 1204, frame memory 1205, adder 1222, intra predictor 1206, inter predictor 1207, and image stitcher 1208.

An input bitstream is inputted to entropy decoder 1201. Thereafter, entropy decoder 1201 entropy decodes the input bitstream, and outputs the entropy decoded values (i.e., quantized values) to inverse quantizer 1202. Entropy decoder 1201 also parses parameters from the input bitstream and outputs the parameters to image stitcher 1208.

Image stitcher 1208 uses the parameters to stitch the reconstructed current image with other images. Thereafter, image stitcher 1208 outputs the stitched image to frame memory 1205.

Inverse quantizer 1202 inversely quantizes the entropy decoded values, and outputs the frequency coefficients to inverse transformer 1203. Inverse transformer 1203 performs an inverse frequency transform on the frequency coefficients to transform the frequency coefficients into sample values (i.e., pixel values), and outputs the resulting pixel values to adder 1222. Adder 1222 adds the obtained pixel values to pixel values of the prediction image output from intra predictor 1206 or inter predictor 1207. Adder 1222 outputs the values obtained via the adding (i.e., the decoded image) to a display, and outputs the obtained values to block memory 1204 or frame memory 1205 in order to perform further prediction.

Intra predictor 1206 performs intra prediction. In other words, intra predictor 1206 estimates an image of the current block using reconstructed pictures stored in block memory 1204 that are included the same picture as the picture of the current block. Inter predictor 1207 performs inter prediction. In other words, inter predictor 1207 estimates an image of the current block using reconstructed pictures stored in frame memory 1205 that are included different pictures than the picture of the current block.

Embodiment 4

[Encoding Process]

Figure 31:
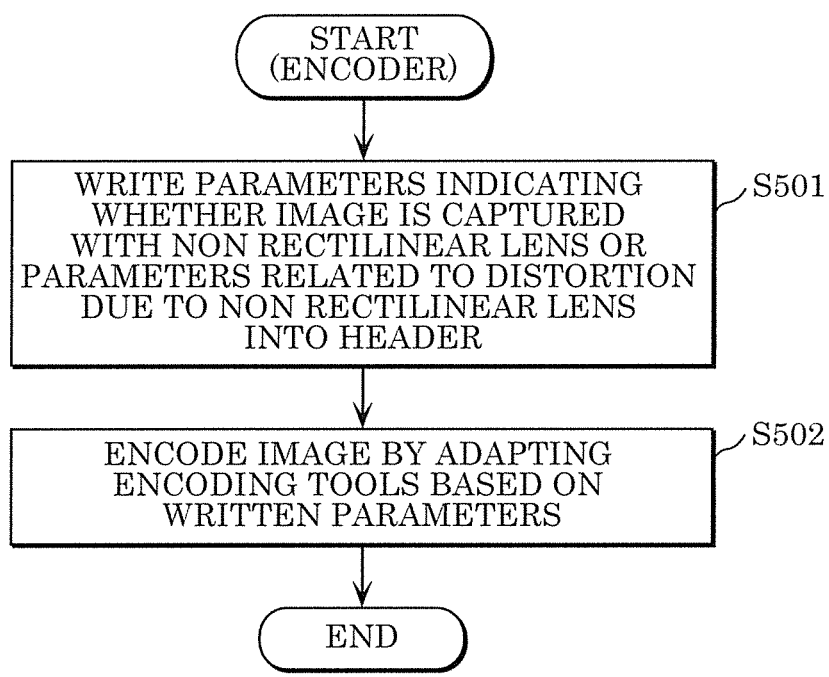
FIG. 31 is a flow chart illustrating one example of a video encoding process according to Embodiment 4.

A method of performing a video encoding process on an image captured using a non rectilinear lens according to Embodiment 4 of the present disclosure as illustrated in FIG. 31 will be described.

FIG. 31 is a flow chart illustrating one example of a video encoding process according to this embodiment.

In step S501, the encoder writes a set of parameters into a header. FIG. 12 illustrates the possible locations of the above mentioned header in a compressed video bitstream. The written parameters include one or more parameters related to an identifier to indicate if the image is captured with a non rectilinear lens. As illustrated in FIG. 13, the captured image may be distorted due to the characteristics of the lens used during the capturing of the image. An example of the written parameters is the position of the center of the distortion or the principle center.

Next, in step S502, the encoder encodes an image by adaptive video encoding tools based on these written parameters. The adaptive video encoding tools include a motion vector prediction process. The set of adaptive video encoding tools may also include an intra prediction process.

<Intra Prediction Process>

Figure 32:
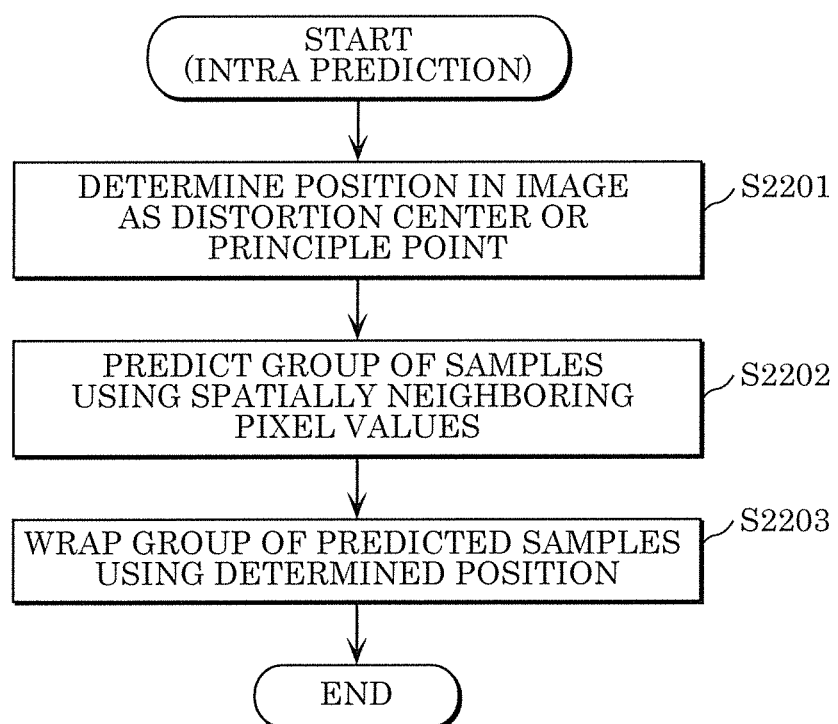
FIG. 32 is a flow chart illustrating an intra prediction process according to Embodiment 4.

FIG. 32 is a flow chart illustrating an intra prediction process adapted based on written parameters. As illustrated in FIG. 32, based on the parameters written in a header, the encoder determines a position in an image as the distortion center or principle point in step S2201. Next, in step S2202, the encoder predicts a group of samples using spatial neighboring pixel values. The group of samples is a group of pixels in, for example, the current block.

Finally in S2203, the encoder performs a wrapping process on the group of predicted samples using the determined distortion center or principle point to produce a block of prediction samples. For example, the encoder may distort an image including the block of prediction samples, and may use the distorted image as a prediction image.

<Motion Vector Prediction>

Figure 33:
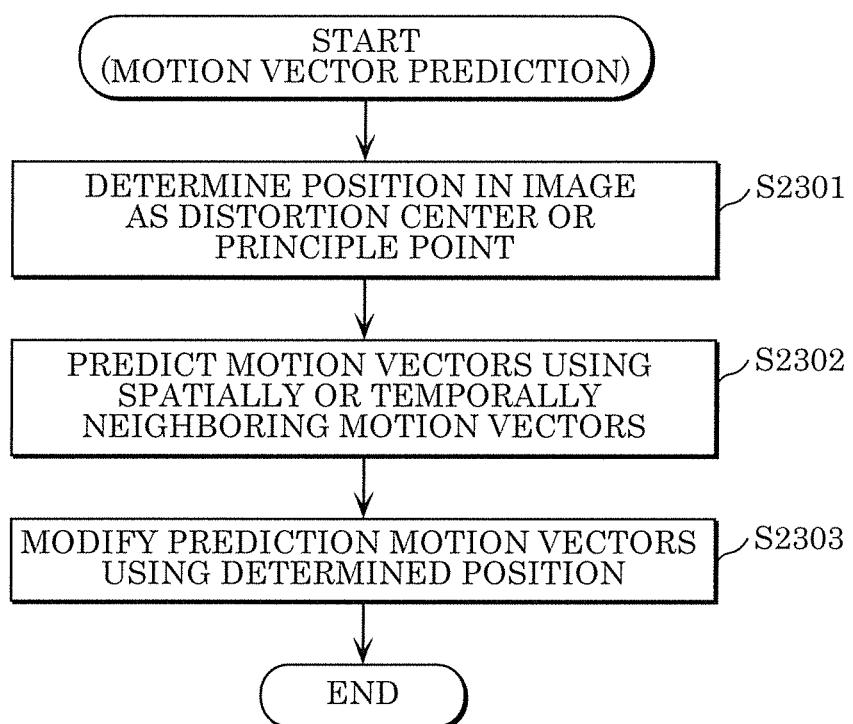
FIG. 33 is a flow chart illustrating a motion vector prediction process according to Embodiment 4.

FIG. 33 is a flow chart illustrating a motion vector prediction process adapted based on the written parameters. As illustrated in FIG. 33, based on the parameters written in a header, the encoder determines a position in an image as the distortion center or principle point in step S2301. Next, in step S2302, the encoder predicts motion vectors from spatial or temporal neighbor's motion vectors.

Finally in S2303, the encoder modifies the direction of the motion vectors using the determined distortion center or principle point.

[Encoder]

Figure 34:
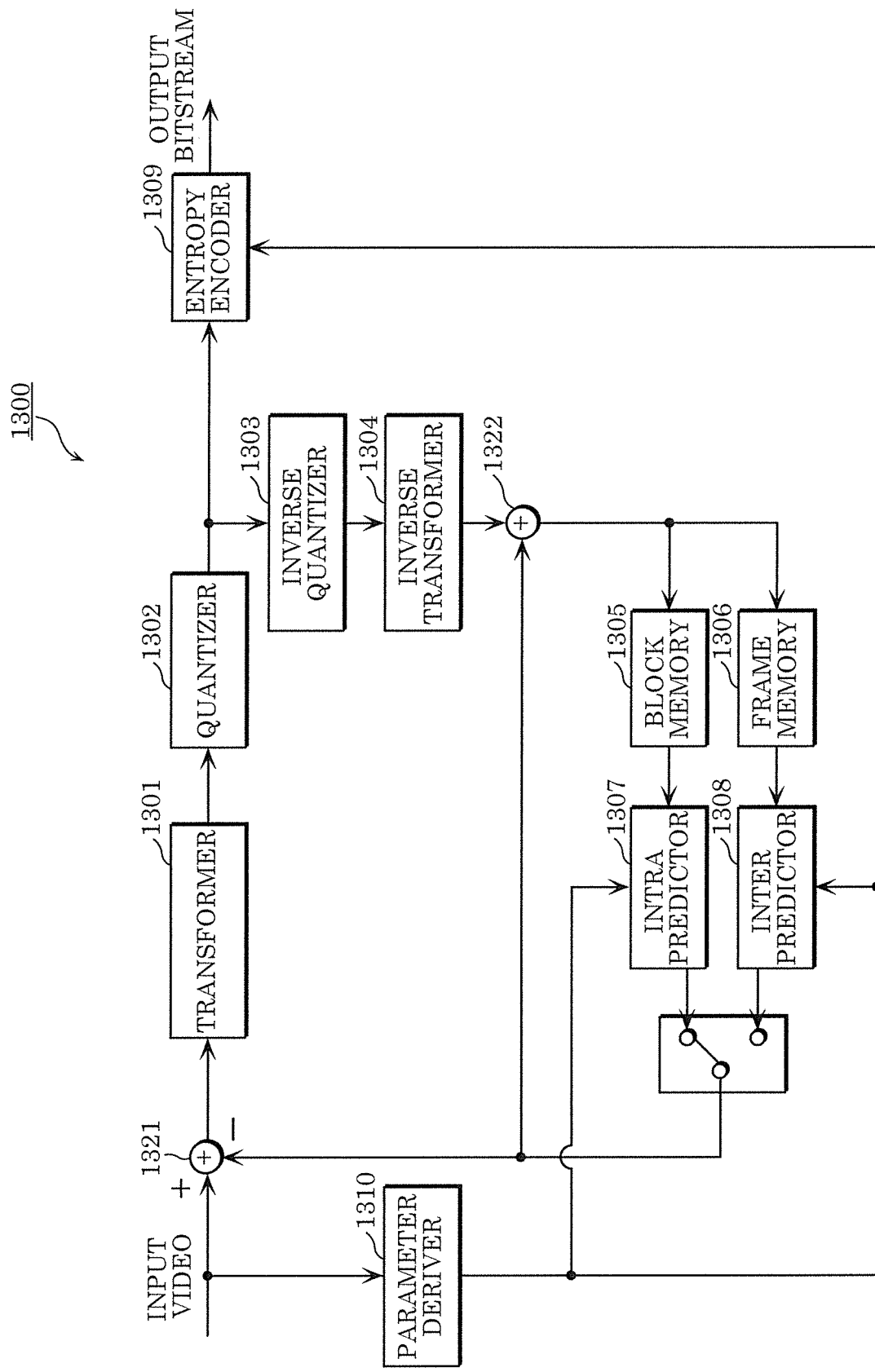
FIG. 34 is a block diagram of an encoder according to Embodiment 4.

FIG. 34 is a block diagram illustrating a configuration of an encoder that encodes a video according to this embodiment.

Encoder 1300 is a device for encoding an input video/image bitstream on a block-by-block basis so as to generate an encoded output bitstream, and corresponds to encoder 100 according to Embodiment 1. As illustrated in FIG. 34, encoder 1300 includes transformer 1301, quantizer 1302, inverse quantizer 1303, inverse transformer 1304, block memory 1305, frame memory 1306, intra predictor 1307, inter predictor 1308, subtractor 1321, adder 1322, entropy encoder 1309, and parameter deriver 1310.

An image of input video (i.e., a current block) is inputted to subtractor 1321, and the added value is outputted to transformer 1301. Stated differently, subtractor 1321 calculates a prediction error by subtracting a prediction image from the current block. Transformer 1301 transforms the added values (i.e., prediction error) into frequency coefficients, and outputs the resulting frequency coefficients to quantizer 1302. Quantizer 1302 quantizes the inputted frequency coefficients, and outputs the resulting quantized values to inverse quantizer 1303 and entropy encoder 1309.

Inverse quantizer 1303 inversely quantizes the sample values (i.e., quantized values) outputted from quantizer 1302, and outputs the frequency coefficients to inverse transformer 1304. Inverse transformer 1304 performs an inverse frequency transform on the frequency coefficients so as to transform the frequency coefficients into sample values, i.e., pixel values, and outputs the resulting sample values to adder 1322.

Similar to Embodiment 1, parameter deriver 1310 derives, from an image, one or more parameters related to an identifier to indicate if the image is captured with a non rectilinear lens (more specifically, one or more parameters indicating the distortion center or principle point). Parameter deriver 1310 then outputs the derived parameters to intra predictor 1307, inter predictor 1308, and entropy encoder 1309. For example, the input video may include the parameters, and in such cases, parameter deriver 1310 extracts and outputs the parameters included in the video. Alternatively, the input video may include parameters functioning as a base for deriving such parameters. In such cases, parameter deriver 1310 extracts the base parameters included in the video, and transforms and outputs the extracted base parameters as the above mentioned parameters.

Adder 1322 adds the pixel values output from inverse transformer 1304 to pixel values of the prediction image output from intra predictor 1307 or inter predictor 1308. Adder 1322 outputs the resulting added values to block memory 1305 or frame memory 1306 in order to perform further prediction.

Intra predictor 1307 performs intra prediction. In other words, intra predictor 1307 estimates an image of the current block using reconstructed pictures stored in block memory 1305 that are included the same picture as the picture of the current block. Inter predictor 1308 performs inter prediction. In other words, inter predictor 1308 estimates an image of the current block using reconstructed pictures stored in frame memory 1306 that are included different pictures than the picture of the current block.

Here, in this embodiment, intra predictor 1307 and inter predictor 1308 perform processing based on the parameters derived by parameter deriver 1310. In other words, intra predictor 1307 and inter predictor 1308 each perform processing in accordance with the flow charts illustrated in FIG. 32 and FIG. 33.

Entropy encoder 1309 encodes quantized values output from quantizer 1302 and parameters derived by parameter deriver 1310, and outputs a bitstream. In other words, entropy encoder 1309 writes those parameters into a header of a bitstream.

[Decoding Process]

Figure 35:
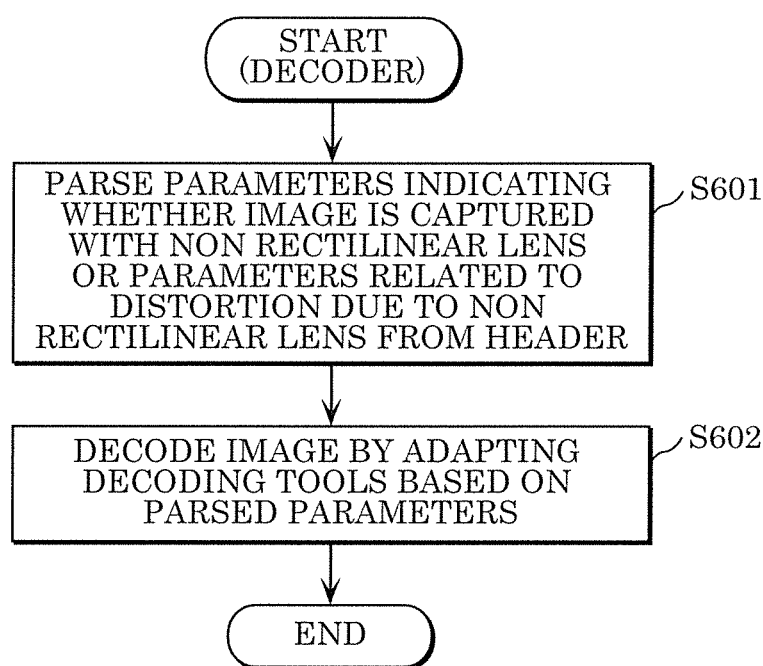
FIG. 35 is a flow chart illustrating one example of a video decoding process according to Embodiment 4.

FIG. 35 is a flow chart illustrating one example of a video decoding process according to this embodiment.

In step S601, the decoder parses a set of parameters from a header. FIG. 12 illustrates the possible locations of the above mentioned header in a compressed video bitstream. The parsed parameters include one or more parameters related to an identifier to indicate if the image is captured with a non rectilinear lens. As illustrated in FIG. 13, the captured image may be distorted due to the characteristics of the lens used during the capturing of the image. An example of the parsed parameters is the position of the center of the distortion or the principle center.

Next, in step S602, the decoder decodes an image by adaptive video decoding tools based on the parsed parameters. The adaptive video decoding tools include a motion vector prediction process. The adaptive video decoding tools may include an intra prediction process. Note that the video decoding tools and adaptive video decoding tools may be the same tools as, or tools corresponding to, the above mentioned video encoding tools and adaptive video encoding tools.

<Intra Prediction Process>

FIG. 32 is a flow chart illustrating an intra prediction process adapted based on parsed parameters. As illustrated in FIG. 32, based on the parsed parameters, the decoder determines a position in an image as the distortion center or principle point in step S2201. Next, in step S2202, the decoder predicts a group of samples using spatial neighboring pixel values. Finally in S2203, the decoder performs a wrapping process on the group of predicted samples using the determined distortion center or principle point to produce a block of prediction samples. For example, the decoder may distort an image including the block of prediction samples, and may use the distorted image as a prediction image.

<Motion Vector Prediction>

FIG. 33 is a flow chart illustrating a motion vector prediction process adapted based on the parsed parameters. As illustrated in FIG. 33, based on the parsed parameters, the decoder determines a position in an image as the distortion center or principle point in step S2301. Next, in step S2302, the decoder predicts motion vectors from spatial or temporal neighbor's motion vectors. Finally in S2303, the decoder modifies the direction of the motion vectors using the determined distortion center or principle point.

[Decoder]

Figure 36:
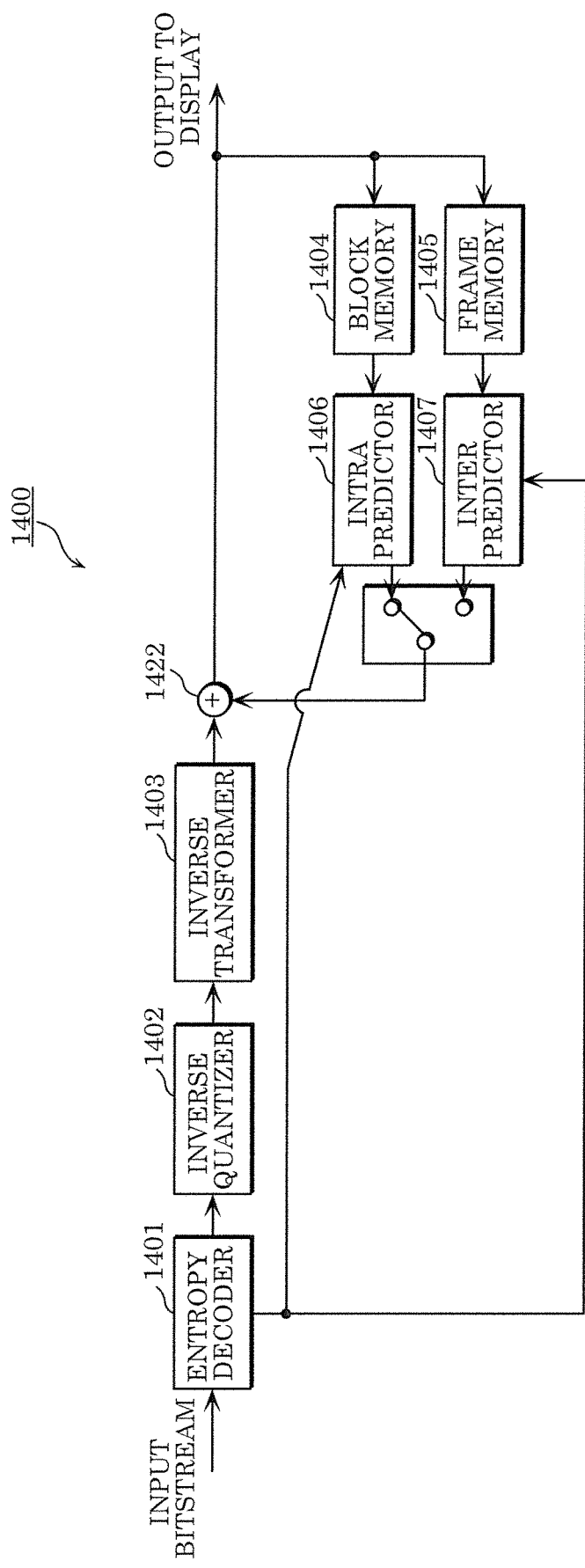
FIG. 36 is a block diagram of a decoder according to Embodiment 4.

FIG. 36 is a block diagram illustrating a configuration of a decoder that decodes a video according to this embodiment.

Decoder 1400 is a device for decoding an input coded video (i.e., input bitstream) on a block-by-block basis to output a decoded video, and corresponds to decoder 200 according to Embodiment 1. As illustrated in FIG. 36, decoder 1400 includes entropy decoder 1401, inverse quantizer 1402, inverse transformer 1403, block memory 1404, frame memory 1405, adder 1422, intra predictor 1406, and inter predictor 1407.

The input bitstream is input into entropy decoder 1401. Thereafter, entropy decoder 1401 entropy decodes the input bitstream, and outputs the entropy decoded values (i.e., quantized values) to inverse quantizer 1402. Entropy decoder 1401 also parses parameters from the input bitstream and outputs the parameters to inter predictor 1407 and intra predictor 1406.

Inverse quantizer 1402 inversely quantizes the entropy decoded values, and outputs the frequency coefficients to inverse transformer 1403. Inverse transformer 1403 performs an inverse frequency transform on the frequency coefficients to transform the frequency coefficients into sample values (i.e., pixel values), and outputs the resulting pixel values to adder 1422. Adder 1422 adds the obtained pixel values to pixel values of the prediction image output from intra predictor 1406 or inter predictor 1407. Adder 1422 outputs the values obtained via the adding (i.e., the decoded image) to a display, and outputs the obtained values to block memory 1404 or frame memory 1405 in order to perform further prediction.

Intra predictor 1406 performs intra prediction. In other words, intra predictor 1406 estimates an image of the current block using reconstructed pictures stored in block memory 1404 that are included the same picture as the picture of the current block. Inter predictor 1407 performs inter prediction. In other words, inter predictor 1407 estimates an image of the current block using reconstructed pictures stored in frame memory 1405 that are included different pictures than the picture of the current block.

Here, in this embodiment, inter predictor 1407 and intra predictor 1406 adapt processing based on parsed parameters. In other words, inter predictor 1407 and intra predictor 1406 each perform processing in accordance with the flow charts illustrated in FIG. 32 and FIG. 33, as adaptive video decoding tools.

CONCLUSION

Although examples of the encoder and decoder according to the present disclosure have been described above based on embodiments, the encoder and the decoder according to one aspect of the present disclosure are not limited to the embodiments.

For example, in the above embodiments, the encoder encodes a video using parameters related to image distortion or parameters related to image stitching, and the decoder decodes the encoded video using the parameters. However, the encoder and the decoder according to one aspect of the present disclosure need not encode or decode video using these parameters. In other words, processing using the adaptive video encoding tools and adaptive video decoding tools described in the above embodiments need not be performed.

Figure 37:
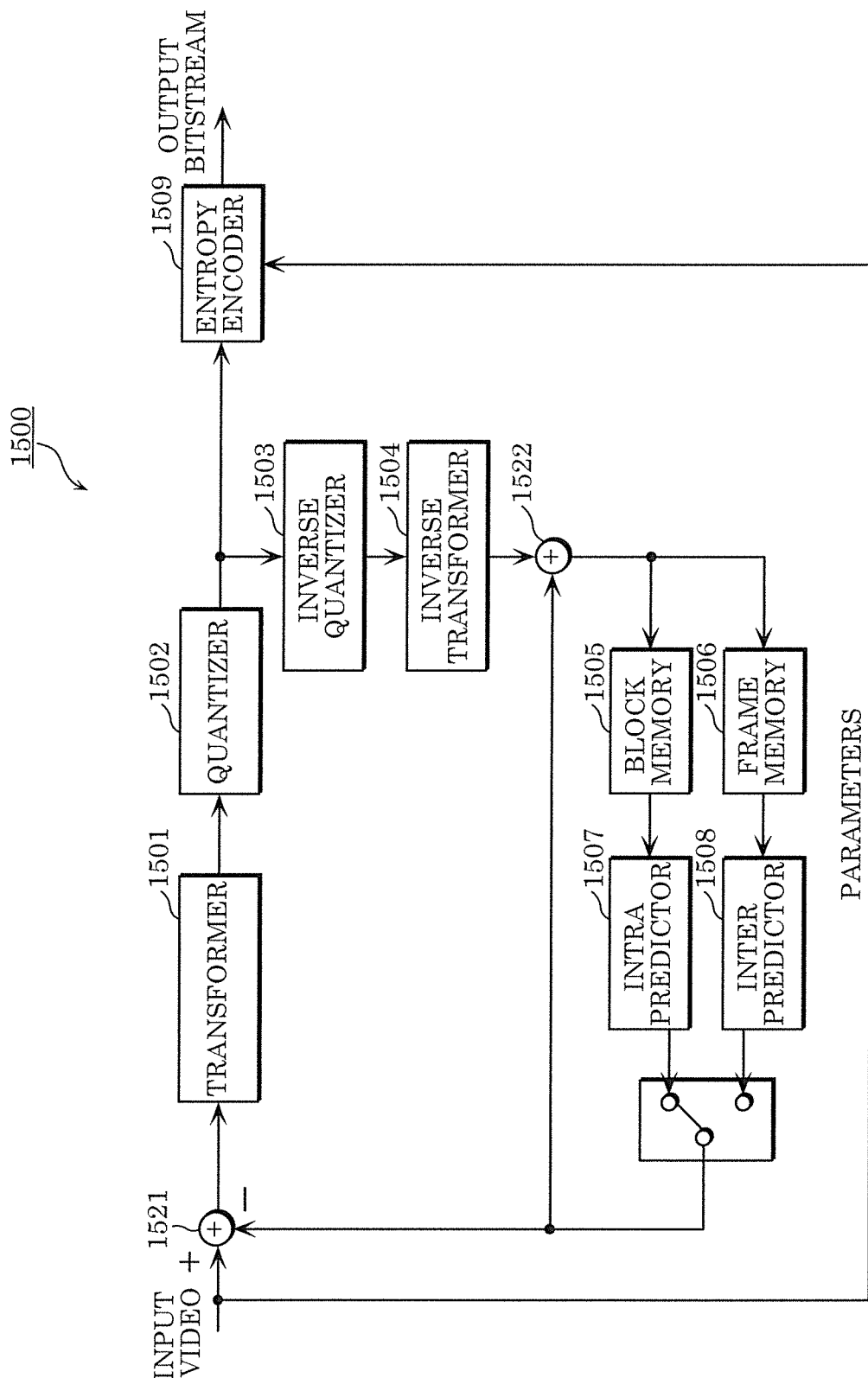
FIG. 37 is a block diagram of an encoder according to one aspect of the present disclosure.

FIG. 37 is a block diagram of an encoder according to one aspect of the present disclosure.

Encoder 1500 according to one aspect of the present disclosure corresponds to encoder 100 according to embodiment 1, and, as illustrated in FIG. 37, includes transformer 1501, quantizer 1502, inverse quantizer 1503, inverse transformer 1504, block memory 1505, frame memory 1506, intra predictor 1507, inter predictor 1508, subtractor 1521, adder 1522, and entropy encoder 1509. Note that encoder 1500 does not include parameter deriver 910, 1110, or 1310.

The elements included in encoder 1500 perform the same processes as described in the above embodiments 1 through 4, but do not perform processing using adaptive video encoding tools. In other words, adder 1522, intra predictor 1507, and inter predictor 1508 perform processing for encoding without using parameters derived by parameter deriver 910, 1110, or 1310 according to embodiments 2 through 4.

Moreover, encoder 1500 obtains a video and parameters related to that video, generates a bitstream by encoding the video without using the parameters, and then writes the parameters into the bitstream. More specifically, entropy encoder 1509 writes the parameters into the bitstream. Note that the parameters may be written at any position in the bitstream.

Moreover, images (i.e., pictures) included in the above mentioned video that is input into encoder 1500 may be distortion-corrected images, and may be stitched images obtained by stitching images from a plurality of views together. Distortion-corrected images are rectangular images obtained by correcting distortion in images captured using a wide angle lens such as a non rectilinear lens. Such an encoder 1500 encodes video including the distortion-corrected images or stitched images.

Here, quantizer 1502, inverse quantizer 1503, inverse transformer 1504, intra predictor 1507, inter predictor 1508, subtractor 1521, adder 1522, and entropy encoder 1509 are implemented as, for example, processing circuitry. Furthermore, block memory 1505 and frame memory 1506 are implemented as memory.

In other words, encoder 1500 includes processing circuitry and memory connected to the processing circuitry. Using the memory, the processing circuitry obtains parameters including at least one of (i) one or more parameters related to a first process for correcting distortion in an image captured with a wide angle lens and (ii) one or more parameters related to a second process for stitching a plurality of images, generates an encoded image by encoding a current image to be processed that is based on the image or the plurality of images, and writes the parameters into a bitstream including the encoded image.

Since the parameters are written into the bitstream, an image to be encoded or decoded can be handled properly by using the parameters.

Here, when writing the parameters, the processing circuitry may write the parameters into a header of the bitstream. When encoding the current image, the processing circuitry may adapt, on a block by block basis, an encoding process based on the parameters, to encode each block included in the current image. The encoding process may include at least one of an inter prediction process and a picture reconstruction process.

With this, for example, as with Embodiment 2, by using an inter prediction process and a picture reconstruction process as adaptive video encoding tools, a current image, which is, for example, a distorted image or stitched image, can be properly encoded. As a result, it is possible to improve the coding efficiency of the current image.

Moreover, when writing the parameters, the processing circuitry may write the one or more parameters related to the second process into a header of the bitstream, and when encoding the current image, when the current image is obtained via the second process, the processing circuitry may skip an encoding process on a block by block basis, based on the one or more parameters related to the second process.

With this, for example, as illustrated in FIG. 21 and FIG. 22 according to Embodiment 2, among images included in the stitched encoded images, the encoding of blocks included in images not to be gazed at by the user in the near future may be skipped. This makes it possible to reduce the processing load and reduce the amount of data to be encoded.

Moreover, when writing the parameters, the processing circuitry may write, as the one or more parameters related to the second process, at least one of a position and a camera angle for each of a plurality of cameras, into a header of the bitstream. When encoding the current image, the processing circuitry may: encode an image from among the plurality of images as the current image; and stitch the current image with a second image among the plurality of images using the parameters written in the header.

With this, for example, as with Embodiment 3, a large stitched image can be used for inter prediction or motion compensation, which improves coding efficiency.

Moreover, when writing the parameters, the processing circuitry may write, as the one or more parameters related to the first process, at least one of a parameter indicating whether an image is captured with the wide angle lens and a parameter related to barrel distortion produced by the wide angle lens, into a header of the bitstream. When encoding the current image, when the current image is an image captured with the wide angle lens, the processing circuitry may adapt, on a block by block basis, an encoding process based on the parameters written in the header, to encode each block included in the current image. The encoding process may include at least one of a motion vector prediction process and an intra prediction process.

With this, for example, as with Embodiment 4, by using a motion vector prediction process and an intra prediction process as adaptive video encoding tools, a current image, which is, for example, a distorted image, can be encoded properly. As a result, it is possible to improve the coding efficiency of a distorted image.

Moreover, the encoding process may include a prediction process, the prediction process being one of the inter prediction process and an intra prediction process. The prediction process may include a wrapping process of arranging or rearranging a plurality of pixels included in an image.

With this, for example, as with Embodiment 2, distortion in a current image can be corrected, and an inter prediction process can be performed properly based on the corrected image. Moreover, for example, as with Embodiment 4, an intra prediction process can be performed on a distorted image, and the resulting prediction image can be distorted properly in accordance with the distorted current image. As a result, it is possible to improve the coding efficiency of a distorted image.

Moreover, the encoding process may include the inter prediction process, and the inter prediction process may include an image padding process performed on a curved, diagonal, or cornered image boundary using the parameters written in the header.

With this, for example, as with Embodiment 2, an inter prediction process can be properly performed, which improves coding efficiency.

Moreover, the encoding process may include the inter prediction process and the picture reconstruction process, and the inter prediction process and the picture reconstruction process may each include a process for rewriting a pixel value to a predetermined value based on the parameters written in the SEI.

With this, for example, as with Embodiment 2, an inter prediction process and a picture reconstruction process can be properly performed, which improves coding efficiency.

Moreover, when encoding the current image, the processing circuitry may: reconstruct the encoded image to generate a reconstructed image; and store an image obtained by stitching the reconstructed image and with the second image into the memory as a reference frame to be used in an inter prediction process.

With this, for example, as with Embodiment 3, a large stitched image can be used for inter prediction or motion compensation, which improves coding efficiency.

Note that the encoder according to Embodiments 2 through 4 encodes a video including distortion-corrected images or stitched images, or encodes a video including unstitched images from a plurality of views. However, the encoder according to the present disclosure may or may not correct distortion in images included in the video in order to encode the video. When distortion is not corrected, the encoder obtains video including images that have already been distortion-corrected by a different device, and encodes the video. Similarly, the encoder according to the present disclosure may or may not stitch images from a plurality of views included in video in order to encode the video. When stitching is not performed, the encoder obtains video including images from a plurality of views that have already been stitched by a different device, and encodes the video. Moreover, the encoder according to the present disclosure may completely correct distortion, and may partially correct distortion. Furthermore, the encoder according to the present disclosure may perform all or part of the stitching of images from the plurality of views.

Figure 38:
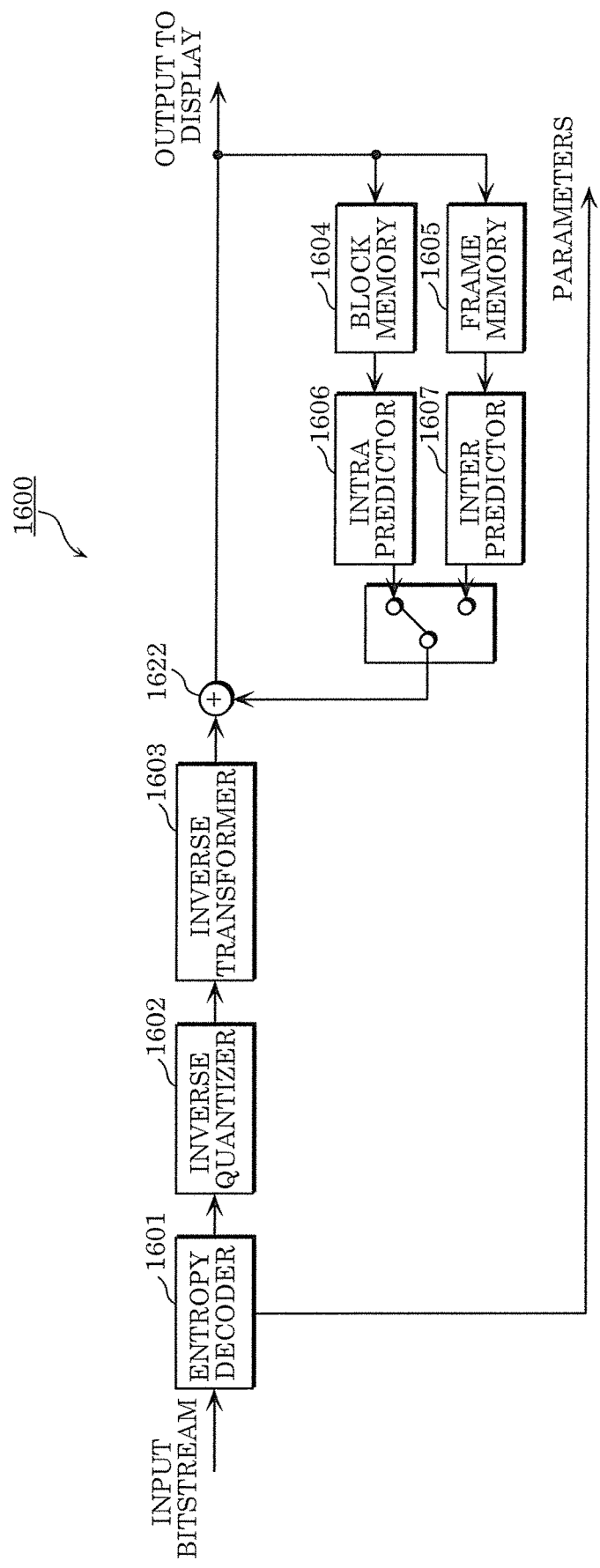
FIG. 38 is a block diagram of a decoder according to one aspect of the present disclosure.

FIG. 38 is a block diagram of a decoder according to one aspect of the present disclosure.

Decoder 1600 according to one aspect of the present disclosure corresponds to decoder 200 according to Embodiment 1, and as illustrated in FIG. 38, includes entropy decoder 1601, inverse quantizer 1602, inverse transformer 1603, block memory 1604, frame memory 1605, intra predictor 1606, inter predictor 1607, and adder 1622.

The elements included in decoder 1600 perform the same processes as described in the above embodiments 1 through 4, but do not perform processing using adaptive video decoding tools. In other words, adder 1622, intra predictor 1606, and inter predictor 1607 perform processing for decoding without using the above mentioned parameters included in the bitstream.

Moreover, decoder 1600 obtains a bitstream, extracts encoded video and parameters from the bitstream, and decodes the encoded video without using the parameters. More specifically, entropy decoder 1601 parses the parameters from the bitstream. Note that the parameters may be written at any position in the bitstream.

Moreover, images (i.e., encoded pictures) included in the bitstream that is input into decoder 1600 may be distortion-corrected images, and may be stitched images obtained by stitching images from a plurality of views together. Distortion-corrected images are rectangular images obtained by correcting distortion in images captured using a wide angle lens such as a non rectilinear lens. Such a decoder 1600 decodes video including the distortion-corrected images or stitched images.

Here, entropy decoder 1601, inverse quantizer 1602, inverse transformer 1603, intra predictor 1606, inter predictor 1607, and adder 1622 are implemented as, for example, processing circuitry. Furthermore, block memory 1604 and frame memory 1605 are implemented as memory.

In other words, decoder 1600 includes processing circuitry and memory connected to the processing circuitry. Using the memory, the processing circuitry obtains a bitstream including an encoded image, parses, from the bitstream, parameters including at least one of (i) one or more parameters related to a first process for correcting distortion in an image captured with a wide angle lens and (ii) one or more parameters related to a second process for stitching a plurality of images, and decodes the encoded image.

An image to be encoded or decoded can be handled properly by using the above mentioned parameters parsed from the bitstream.

Here, when parsing the parameters, the processing circuitry may parse the parameters from a header of the bitstream. When decoding the encoded image, the processing circuitry may adapt, on a block by block basis, a decoding process based on the parameters, to decode each block included in the encoded image. The decoding process may include at least one of an inter prediction process and a picture reconstruction process.

With this, for example, as with Embodiment 2, by using an inter prediction process and a picture reconstruction process as adaptive video decoding tools, encoded images, which are, for example, distorted images or stitched images, can be decoded properly.

Moreover, when parsing the parameters, the processing circuitry may parse the one or more parameters related to the second process from a header of the bitstream. When decoding the encoded image, when the encoded image is generated by encoding an image obtained via the second process, the processing circuitry may skip a decoding process on a block by block basis, based on the one or more parameters related to the second process.

With this, for example, as illustrated in FIG. 21 and FIG. 22 according to Embodiment 2, among images included in the stitched encoded images, the decoding of blocks included in images not to be gazed at by the user in the near future may be skipped. This makes it possible to reduce the processing load.

Moreover, when parsing the parameters, the processing circuitry may parse, as the one or more parameters related to the second process, at least one of a position and a camera angle for each of a plurality of cameras, from a header of the bitstream. When decoding the encoded image, the processing circuitry may: decode an image encoded from among the plurality of images as the encoded image; and stitch the encoded image with a second image among the plurality of images using the parameters parsed from the header.

With this, for example, as with Embodiment 3, a large stitched image can be used for inter prediction or motion compensation, making it possible to properly decode an efficiently encoded bitstream.

Moreover, when parsing the parameters, the processing circuitry may parse, as the one or more parameters related to the first process, at least one of a parameter indicating whether an image is captured with the wide angle lens and a parameter related to barrel distortion produced by the wide angle lens, from a header of the bitstream. When decoding the encoded image, when the encoded image is generated by encoding an image captured with the wide angle lens, the processing circuitry may adapt, on a block by block basis, a decoding process based on the parameters parsed from the header, to decode each block included in the encoded image. The decoding process may include at least one of a motion vector prediction process and an intra prediction process.

With this, for example, as with Embodiment 4, by using a motion vector prediction process and an intra prediction process as adaptive video decoding tools, encoded images, which are, for example, distorted images, can be decoded properly.

Moreover, the decoding process may include a prediction process, the prediction process being one of the inter prediction process and an intra prediction process, and the prediction process may include a wrapping process of arranging or rearranging a plurality of pixels included in an image.

With this, for example, as with Embodiment 2, distortion in an encoded image can be corrected, and an inter prediction process can be performed properly based on the corrected image. Moreover, for example, as with Embodiment 4, an intra prediction process can be performed on a distorted encoded image, and the resulting prediction image can be distorted properly in accordance with the distorted encoded image. As a result, it is possible to properly predict a distorted encoded image.

Moreover, the decoding process may include the inter prediction process, and the inter prediction process may include an image padding process performed on a curved, diagonal, or cornered image boundary using the parameters parsed from the header.

With this, for example, as with Embodiment 2, an inter prediction process can be properly performed.

Moreover, the decoding process may include the inter prediction process and the picture reconstruction process, and the inter prediction process and the picture reconstruction process may each include a process for rewriting a pixel value to a predetermined value based on the parameters parsed from the header.

With this, for example, as with Embodiment 2, an inter prediction process and a picture reconstruction process can be properly performed.

Moreover, when decoding the encoded image, the processing circuitry may: decode the encoded image to generate a decoded image; and store an image obtained by stitching the decoded image with the second image into the memory as a reference frame to be used in an inter prediction process.

With this, for example, as with Embodiment 3, a large stitched image can be used for inter prediction or motion compensation.

Note that the decoder according to Embodiments 2 through 4 decodes a bitstream including distorted images, a bitstream including stitched images, or a bitstream including unstitched images from a plurality of views. However, the decoder according to the present disclosure may or may not correct distortion in images included in the bitstream in order to decode the bitstream. When distortion is not corrected, the decoder obtains a bitstream including images that have already been distortion-corrected by a different device, and decodes the bitstream. Similarly, the decoder according to the present disclosure may or may not stitch images from a plurality of views included in the bitstream in order to decode the bitstream. When stitching is not performed, the decoder obtains a bitstream including large images that have already been generated by a different device by stitching images from a plurality of views together, and decodes the bitstream. Moreover, the decoder according to the present disclosure may completely correct distortion, and may partially correct distortion. Furthermore, the decoder according to the present disclosure may perform all or part of the stitching of images from the plurality of views.

Other Embodiments

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present invention are not limited to the above exemplary embodiments; various modifications may be made to the exemplary embodiments, the results of which are also included within the scope of the embodiments of the present invention.

Next, application examples of the moving picture encoding method (image encoding method) and the moving picture decoding method (image decoding method) described in each of the above embodiments and a system that employs the same will be described. The system is characterized as including an image encoding device that employs the image encoding method, an image decoding device that employs the image decoding method, and an image encoding/decoding device that includes both the image encoding device and the image decoding device. Other configurations included in the system may be modified on a case-by-case basis.

[Usage Examples]

Figure 39:
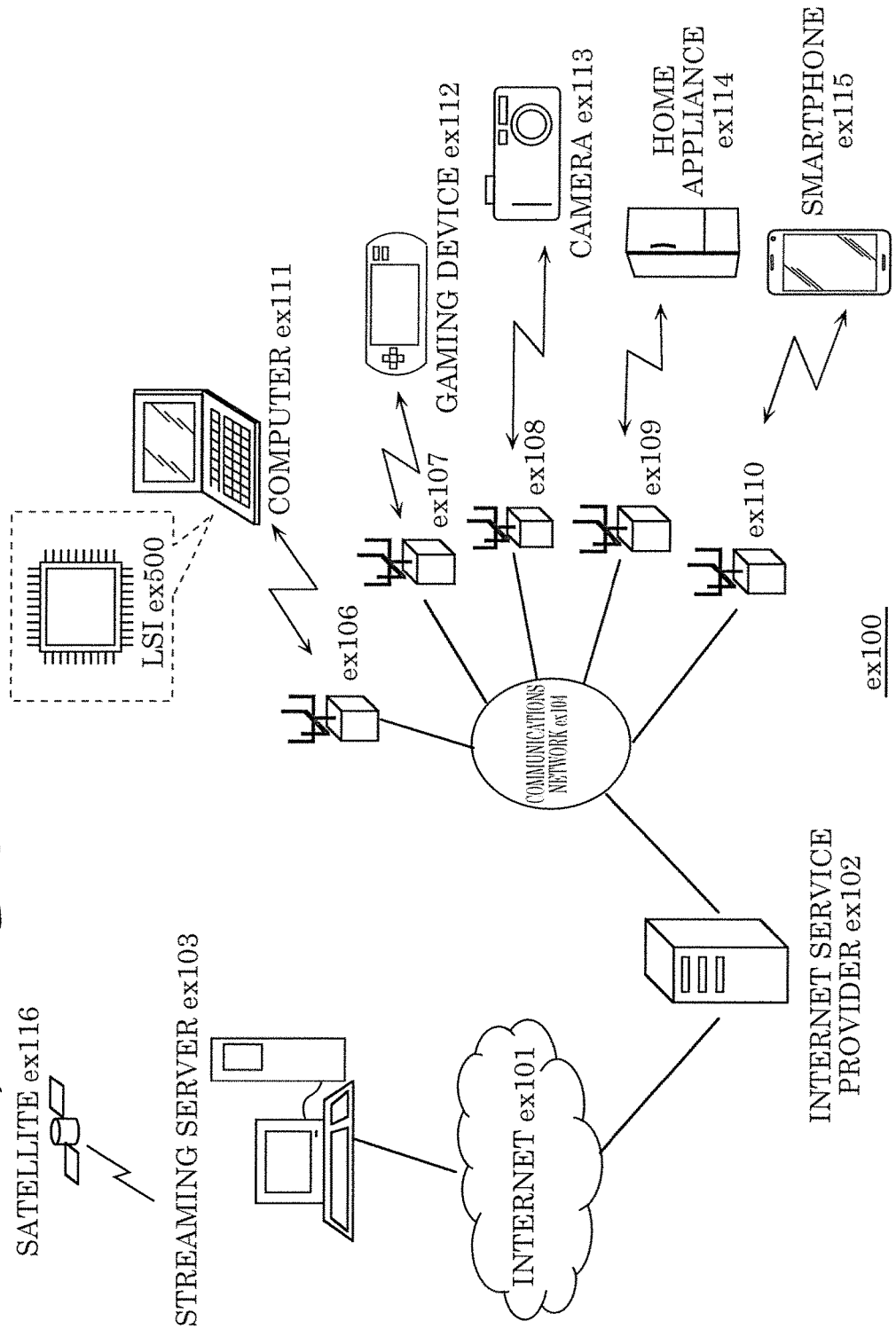
FIG. 39 illustrates an overall configuration of a content providing system for implementing a content distribution service.

FIG. 39 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoding device according to one aspect of the present invention.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoding device according to one aspect of the present invention.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoding device may obtain or store virtual object information and three-dimensional data, generate two-dimensional images based on movement from the perspective of the user, and then generate superimposed data by seamlessly connecting the images. Alternatively, the decoding device may transmit, to the server, motion from the perspective of the user in addition to a request for virtual object information, and the server may generate superimposed data based on three-dimensional data stored in the server in accordance with the received motion, and encode and stream the generated superimposed data to the decoding device. Note that superimposed data includes, in addition to RGB values, an $\alpha$ value indicating transparency, and the server sets the $\alpha$ value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoding device or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 40:
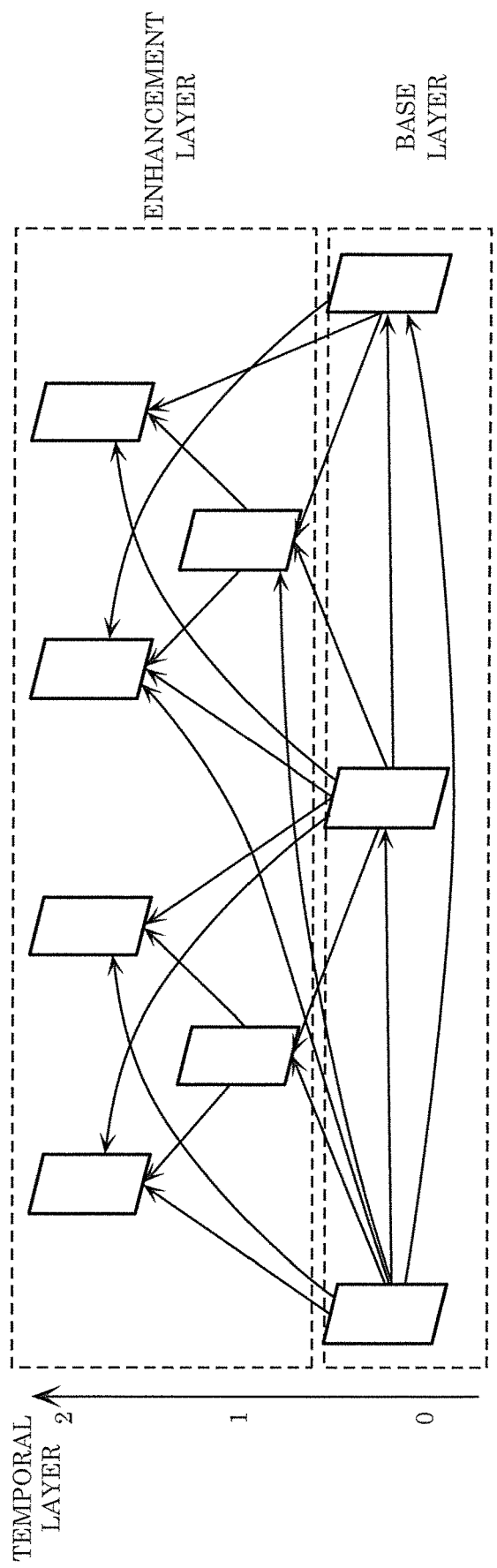
FIG. 40 illustrates one example of encoding structure in scalable encoding.

The switching of content will be described with reference to a scalable stream, illustrated in FIG. 40, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 40. Note that there may be a plurality of individual streams that are of the same content but different quality. In other words, by determining which layer to decode up to based on internal factors, such as the processing ability on the decoding device side, and external factors, such as communication bandwidth, the decoding device side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoding device side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 41:
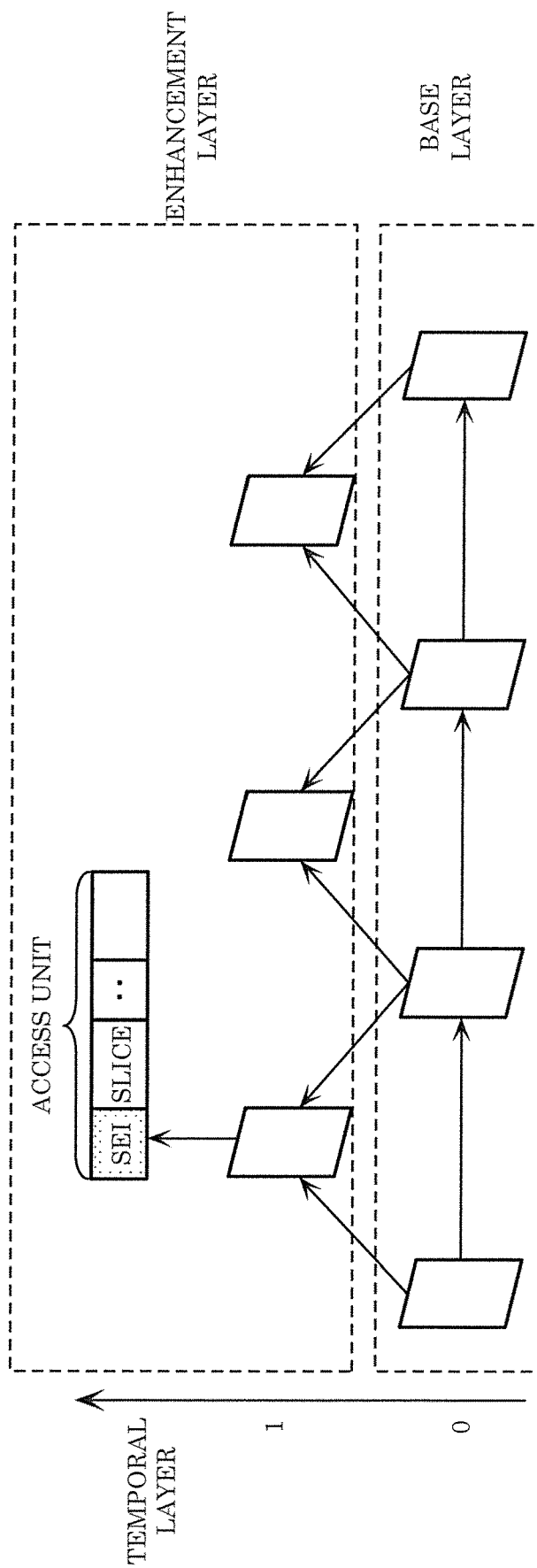
FIG. 41 illustrates one example of encoding structure in scalable encoding.

Alternatively, a configuration in which a picture is divided into, for example, tiles in accordance with the meaning of, for example, an object in the image, and on the decoding device side, only a partial region is decoded by selecting a tile to decode, is also acceptable. Moreover, by storing an attribute about the object (person, car, ball, etc.) and a position of the object in the video (coordinates in identical images) as metadata, the decoding device side can identify the position of a desired object based on the metadata and determine which tile or tiles include that object. For example, as illustrated in FIG. 41, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoding device side can obtain, for example, the time at which a specific person appears in the video, and by fitting that with picture unit information, can identify a picture in which the object is present and the position of the object in the picture.

[Web Page Optimization]

Figure 42:
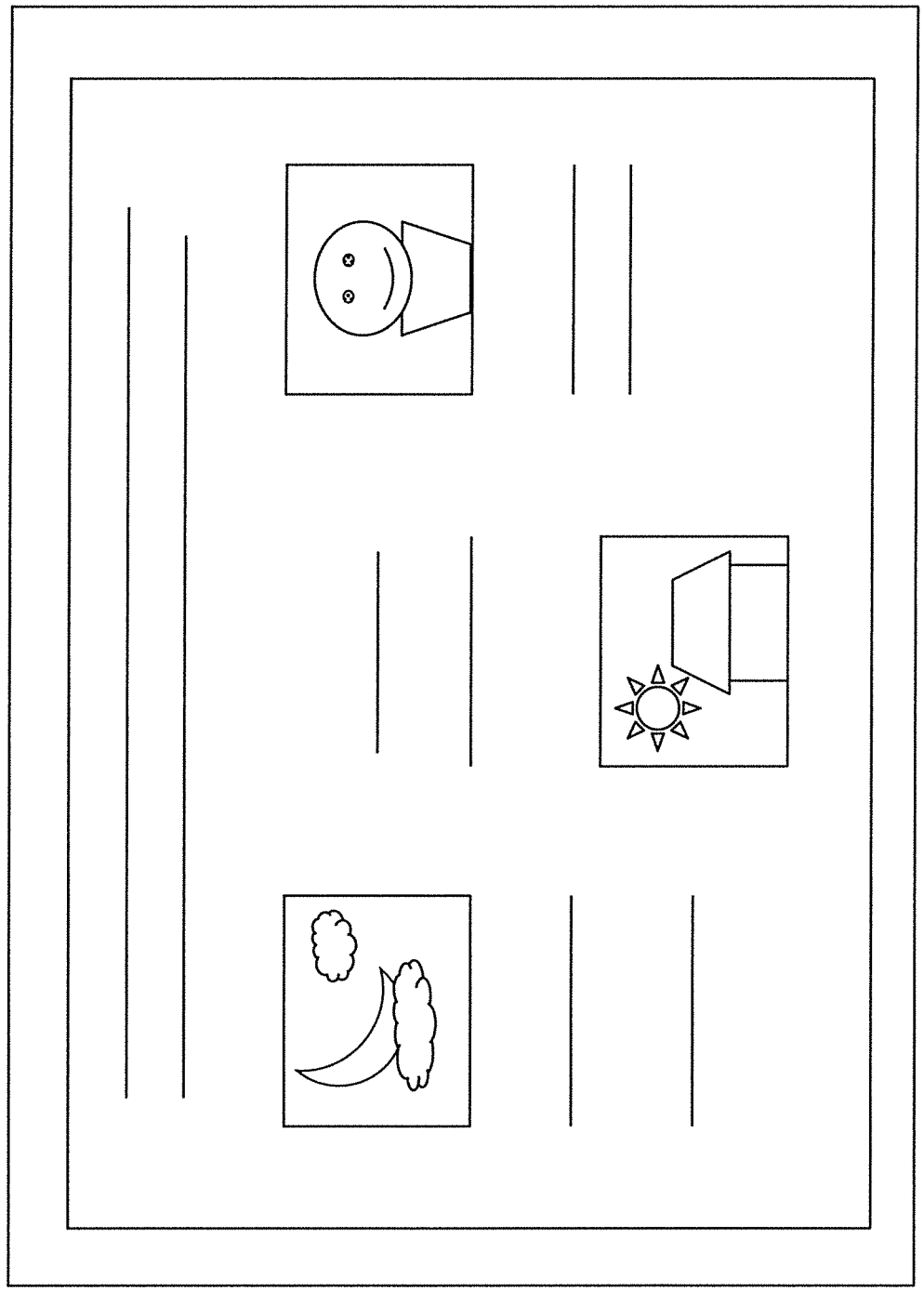
FIG. 42 illustrates an example of a display screen of a web page.
Figure 43:
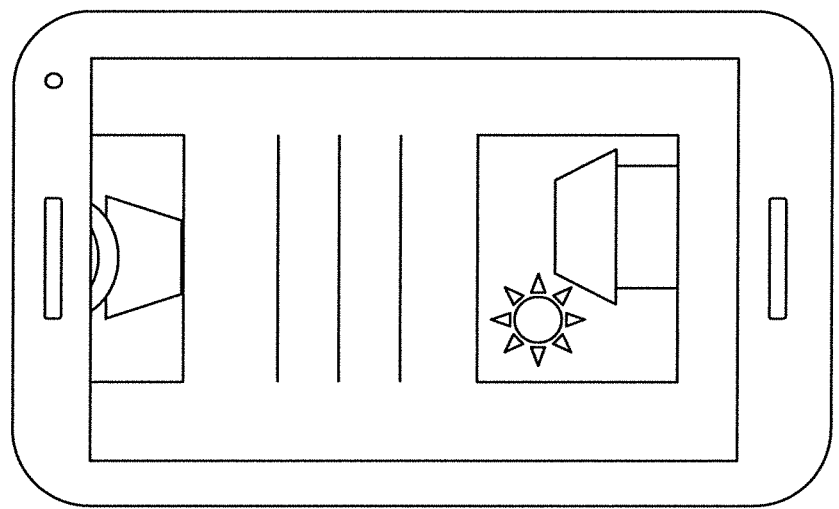
FIG. 43 illustrates an example of a display screen of a web page.

FIG. 42 illustrates an example of a display screen of a web page on, for example, computer ex111. FIG. 43 illustrates an example of a display screen of a web page on, for example, smartphone ex115. As illustrated in FIG. 42 and FIG. 43, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoding device) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is up dated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoding device first receives the base layer as the highest priority and performs decoding and reproduction, although this may differ depending on bandwidth. When the content is reproduced two or more times, such as when the decoding device receives the enhancement layer during decoding and reproduction of the base layer and loops the reproduction, the decoding device may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoding device (image encoding device) or the moving picture decoding device (image decoding device) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 44:
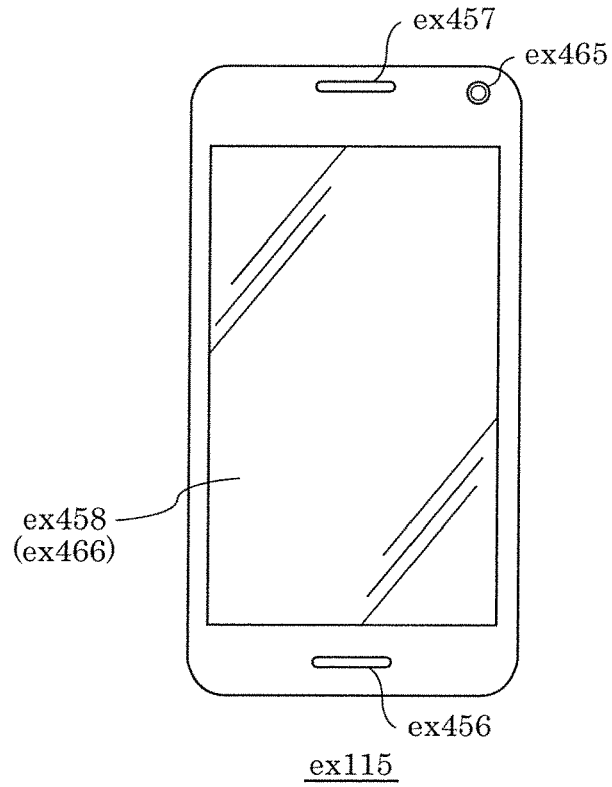
FIG. 44 illustrates one example of a smartphone.
Figure 45:
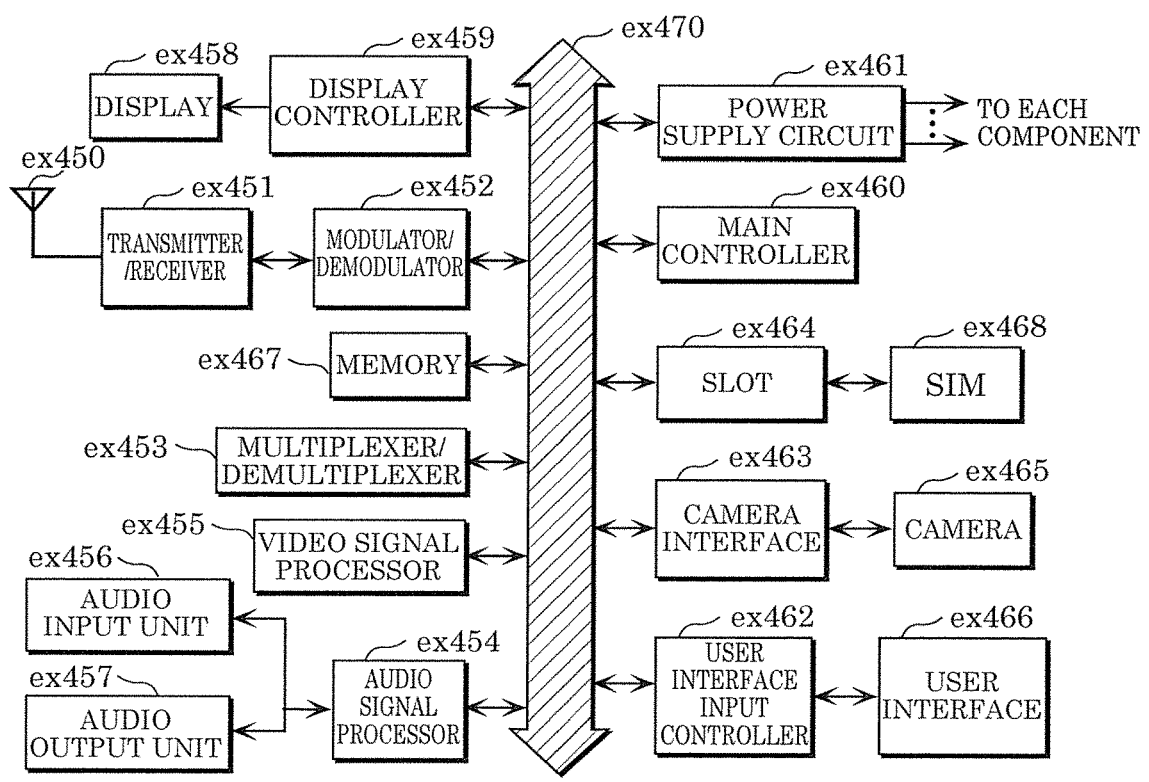
FIG. 45 is a block diagram illustrating a configuration example of a smartphone.

FIG. 44 illustrates smartphone ex115. FIG. 45 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoding device and a decoding device; a transmitter terminal including only an encoding device; and a receiver terminal including only a decoding device. Further, in the description of the digital broadcasting system, an example is given in which multiplexed data obtained as a result of video data being multiplexed with, for example, music data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure can be applied to, for example, encoders that encoded an image and decoders that decode an encoded image, such as televisions, digital video recorders, car navigation systems, cellular telephones, digital cameras, and digital video cameras.

What is claimed is:

1. An encoder, comprising:
processing circuitry and memory connected to the processing circuitry,
wherein, using the memory, the processing circuitry:
obtains parameters including at least one of (i) one or more parameters related to a first process for correcting distortion in an image captured with a wide angle lens and (ii) one or more parameters related to a second process for stitching a plurality of images;
generates an encoded image by encoding a current image to be processed that is based on the image or the plurality of images; and
writes the parameters into a bitstream including the encoded image, wherein
when writing the parameters, the processing circuitry writes the one or more parameters related to the second process into supplemental enhancement information (SEI) in the bitstream, and
when encoding the current image, when the current image is obtained via the second process, the processing circuitry skips an encoding process on a block by block basis, based on the one or more parameters related to the second process.

2. The encoder according to claim 1, wherein
when writing the parameters, the processing circuitry writes the parameters into supplemental enhancement information (SEI) in the bitstream,
when encoding the current image, the processing circuitry adapts, on a block by block basis, an encoding process based on the parameters, to encode each block included in the current image, and
the encoding process includes at least one of an inter prediction process and a picture reconstruction process.

3. The encoder according to claim 1, wherein
when writing the parameters, the processing circuitry writes, as the one or more parameters related to the second process, at least one of a position and a camera angle for each of a plurality of cameras, into supplemental enhancement information (SEI) in the bitstream, and
when encoding the current image, the processing circuitry:
encodes an image from among the plurality of images as the current image; and
stitches the current image with a second image among the plurality of images using the parameters written in the SEI.

4. The encoder according to claim 2, wherein
the encoding process includes a prediction process, the prediction process being one of the inter prediction process and an intra prediction process, and
the prediction process includes a wrapping process of arranging or rearranging a plurality of pixels included in an image.

5. The encoder according to claim 2, wherein
the encoding process includes the inter prediction process, and
the inter prediction process includes an image padding process performed on a curved, diagonal, or cornered image boundary using the parameters written in the SEI.

6. The encoder according to claim 2, wherein
the encoding process includes the inter prediction process and the picture reconstruction process, and
the inter prediction process and the picture reconstruction process each include a process for rewriting a pixel value to a predetermined value based on the parameters written in the SEI.

7. The encoder according to claim 3, wherein
when encoding the current image, the processing circuitry:
  reconstructs the encoded image to generate a reconstructed image; and
  stores an image obtained by stitching the reconstructed image and with the second image into the memory as a reference frame to be used in an inter prediction process.

8. A decoder, comprising:
processing circuitry and memory connected to the processing circuitry,
wherein, using the memory, the processing circuitry:
  obtains a bitstream including an encoded image;
  parses, from the bitstream, parameters including at least one of (i) one or more parameters related to a first process for correcting distortion in an image captured with a wide angle lens and (ii) one or more parameters related to a second process for stitching a plurality of images; and
  decodes the encoded image, wherein
when parsing the parameters, the processing circuitry parses the one or more parameters related to the second process from supplemental enhancement information (SEI) in the bitstream, and
when decoding the encoded image, when the encoded image is generated by encoding an image obtained via the second process, the processing circuitry skips a decoding process on a block by block basis, based on the one or more parameters related to the second process.

9. The decoder according to claim 8, wherein
when parsing the parameters, the processing circuitry parses the parameters from supplemental enhancement information (SEI) in the bitstream,
when decoding the encoded image, the processing circuitry adapts, on a block by block basis, a decoding process based on the parameters, to decode each block included in the encoded image, and
the decoding process includes at least one of an inter prediction process and a picture reconstruction process.

10. The decoder according to claim 8, wherein
when parsing the parameters, the processing circuitry parses, as the one or more parameters related to the second process, at least one of a position and a camera angle for each of a plurality of cameras, from supplemental enhancement information (SEI) in the bitstream, and
when decoding the encoded image, the processing circuitry:
  decodes an image encoded from among the plurality of images as the encoded image; and
  stitches the encoded image with a second image among the plurality of images using the parameters parsed from the SEI.

11. The decoder according to claim 9, wherein
the decoding process includes a prediction process, the prediction process being one of the inter prediction process and an intra prediction process, and
the prediction process includes a wrapping process of arranging or rearranging a plurality of pixels included in an image.

12. The decoder according to claim 9, wherein
the decoding process includes the inter prediction process, and
the inter prediction process includes an image padding process performed on a curved, diagonal, or cornered image boundary using the parameters parsed from the SEI.

13. The decoder according to claim 9, wherein
the decoding process includes the inter prediction process and the picture reconstruction process, and
the inter prediction process and the picture reconstruction process each include a process for rewriting a pixel value to a predetermined value based on the parameters parsed from the SEI.

14. The decoder according to claim 10, wherein
when decoding the encoded image, the processing circuitry:
  decodes the encoded image to generate a decoded image; and
  stores an image obtained by stitching the decoded image with the second image into the memory as a reference frame to be used in an inter prediction process.

15. An encoding method, comprising:
obtaining parameters including at least one of (i) one or more parameters related to a first process for correcting distortion in an image captured with a wide angle lens and (ii) one or more parameters related to a second process for stitching a plurality of images;
generating an encoded image by encoding a current image to be processed that is based on the image or the plurality of images; and
writing the parameters into a bitstream including the encoded image, wherein
when writing the parameters, the one or more parameters related to the second process are written into supplemental enhancement information (SEI) in the bitstream, and
when encoding the current image, when the current image is obtained via the second process, an encoding process is skipped on a block by block basis, based on the one or more parameters related to the second process.

16. A decoding method, comprising:
obtaining a bitstream including an encoded image;
parsing, from the bitstream, parameters including at least one of (i) one or more parameters related to a first process for correcting distortion in an image captured with a wide angle lens and (ii) one or more parameters related to a second process for stitching a plurality of images; and
decoding the encoded image, wherein
when parsing the parameters, the one or more parameters related to the second process are parsed from supplemental enhancement information (SEI) in the bitstream, and
when decoding the encoded image, when the encoded image is generated by encoding an image obtained via the second process, a decoding process is skipped on a block by block basis, based on the one or more parameters related to the second process.

* * * * *